(12) United States Patent
Ushio et al.

(10) Patent No.: US 12,483,566 B2
(45) Date of Patent: Nov. 25, 2025

(54) VEHICLE ATTACK EVENT CONTINUITY DETERMINATION METHOD, VEHICLE ATTACK EVENT CONTINUITY DETERMINATION DEVICE, AND NON-TRANSITORY COMPUTER-READABLE RECORDING MEDIUM

(71) Applicant: Panasonic Intellectual Property Corporation of America, Torrance, CA (US)

(72) Inventors: Takashi Ushio, Osaka (JP); Takamitsu Sasaki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 297 days.

(21) Appl. No.: 18/141,614

(22) Filed: May 1, 2023

(65) Prior Publication Data
US 2023/0269258 A1   Aug. 24, 2023

Related U.S. Application Data

(63) Continuation of application No. PCT/JP2021/025103, filed on Jul. 2, 2021.
(Continued)

(51) Int. Cl.
  *H04L 9/40*  (2022.01)
  *H04L 67/12*  (2022.01)
(52) U.S. Cl.
  CPC ...... *H04L 63/1416* (2013.01); *H04L 63/1425* (2013.01); *H04L 67/12* (2013.01)
(58) Field of Classification Search
  CPC . H04L 63/1416; H04L 63/1425; H04L 67/12; H04L 2463/146; H04L 63/1441; G06F 21/552; G05B 23/02
(Continued)

(56) References Cited

U.S. PATENT DOCUMENTS

2017/0302691 A1* 10/2017 Singh .................. H04L 63/1458
2020/0143053 A1*  5/2020 Gutierrez .............. G06F 21/554
(Continued)

FOREIGN PATENT DOCUMENTS

CN    111581643    8/2020
JP    2015-26252   2/2015
WO    2019/227076  11/2019

OTHER PUBLICATIONS

International Search Report (ISR) issued on Aug. 24, 2021 in International (PCT) Application No. PCT/JP2021/025103.
(Continued)

*Primary Examiner* — Tan Doan
(74) *Attorney, Agent, or Firm* — Wenderoth, Lind & Ponack, L.L.P.

(57) ABSTRACT

A vehicle attack continuity determination method includes: obtaining first vehicle attack event information pertaining to a first vehicle attack event which has occurred in an in-vehicle network, second vehicle attack event information pertaining to a second vehicle attack event which has occurred in the in-vehicle network before the first vehicle attack event, and in-vehicle network information indicating a configuration of the in-vehicle network; determining whether there is continuity between the first vehicle attack event and the second vehicle attack event based on the first vehicle attack event information, the second vehicle attack event information, and the in-vehicle network information; and outputting a result of the determining.

11 Claims, 19 Drawing Sheets

Related U.S. Application Data

(60) Provisional application No. 63/116,479, filed on Nov. 20, 2020.

(58) Field of Classification Search
USPC .......................................................... 726/26
See application file for complete search history.

(56) References Cited

U.S. PATENT DOCUMENTS

| | | | |
|---|---|---|---|
| 2021/0056206 A1* | 2/2021 | Hirano | G01C 21/3697 |
| 2021/0258334 A1* | 8/2021 | Sayag | H04L 63/1425 |

OTHER PUBLICATIONS

Extended European Search Report issued Mar. 28, 2024 in corresponding European Patent Application No. 21894256.3.

"Methodologies for intrusion detection system on in-vehicle networks", ITU-T Draft; Study Period 2017-2020; Study Group 17, International Telecommunication Union, Geneva; CH, vol. ties/17, Aug. 2020, pp. 1-38.

Ankang Ju et al., "MCKC: a modified cyber kill chain model for cognitive APTs analysis within Enterprise multimedia network", Multimedia Tools and Applications, Kluwer Academic Publishers, Boston, US, vol. 79, No. 39-40, Aug. 2020, pp. 29923-29949.

* cited by examiner

FIG. 3

| Depth | First layer defense | First layer IDS | Second layer IDS | Second layer defense |
|---|---|---|---|---|
| Anomaly detection type | ECU_A Defense error | ECU_A IDS | ECU_C IDS | ECU_D Defense error |
| Detection time | YY1:MM1/DD1 : HH1:MM1:SS1 | YY2:MM2/DD2 : HH2:MM2:SS2 | YY3:MM3/DD3 : HH3:MM3:SS3 | YY4:MM4/DD4 : HH4:MM4:SS4 |

FIG. 4

| Detection no. | ECU name | Anomaly detection type | Detection time | ... |
|---|---|---|---|---|
| 1 | ECU_C | IDS (anomaly detection) | 2020:04/01 12:00:36 | ... |
| 2 | ECU_D | Defense error | 2020:04/01 12:00:37 | ... |

FIG. 5

| Vehicle function event | Vehicle function usage rate | ... |
|---|---|---|
| Engine running event | 60% | ... |

FIG. 7

Vehicle attack event information

| Vehicle attack event no. | Vehicle no. | Vehicle attack event information reception time | Detection no. | ECU name | Anomaly detection type | Detection time |
|---|---|---|---|---|---|---|
| ⋮ | ⋮ | ⋮ | ⋮ | ⋮ | ⋮ | ⋮ |
| 1 | 100 | 2020:03/30 19:05 | 1 | ECU_A | Defense error | 2020:03/30 18:59:43 |
|   |   |   | 2 | ECU_A | IDS (anomaly detection) | 2020:03/30 19:00:00 |
| 2 | 100 | 2020:03/31 10:05 | 1 | ECU_B | IDS (anomaly detection) | 2020:03/31 10:00:36 |
| 3 | 100 | 2020:03/31 15:05 | 1 | ECU_E | IDS (anomaly detection) | 2020:03/31 15:00:36 |
| 4 | 100 | 2020:04/01 12:05 | 1 | ECU_C | IDS (anomaly detection) | 2020:04/01 12:00:36 |
|   |   |   | 2 | ECU_D | Defense error | 2020:04/01 12:00:37 |
| ⋮ | ⋮ | ⋮ | ⋮ | ⋮ | ⋮ | ⋮ |

FIG. 8

| Vehicle attack event no. | Vehicle no. | Vehicle attack event information reception time | Vehicle attack event information ||
|---|---|---|---|---|
| | | | Vehicle function event | Vehicle function usage rate |
| ⋮ | ⋮ | ⋮ | ⋮ | ⋮ |
| 1 | 100 | 2020:03/30 19:05 | Engine running event | 60% |
| 2 | 100 | 2020:03/31 10:05 | N/A | 0% |
| 3 | 100 | 2020:03/31 15:05 | N/A | 0% |
| 4 | 100 | 2020:04/01 12:05 | Automatic driving activation event | 0% |
| ⋮ | ⋮ | ⋮ | ⋮ | ⋮ |

FIG. 9

| Connection origin ECU | Connection destination ECU | Connection origin ECU entry point flag |
|---|---|---|
| ... | ... | ... |
| ECU_A | ECU_B | True |
| ECU_B | ECU_C | False |
| ... | ... | ... |

FIG. 19

Merge events

Merger source event

| Event no. | Date of occurrence |
|---|---|
| 2633 | 2020/10/19 12:00 |

Merger target event

| Execute merge | Event no. | Date of occurrence | Event continuity | Post-merger reliability level |
|---|---|---|---|---|
|  | 2633 | 2020/10/16 20:00 | Yes | 50% |
| ✓ | 2632 | 2020/10/15 20:00 | Yes | 80% |
|  | 2631 | 2020/10/15 10:00 | No | No |
|  | 2630 | 2020/10/13 12:00 | No | No |

[ Merge and analyze ]

VEHICLE ATTACK EVENT CONTINUITY DETERMINATION METHOD, VEHICLE ATTACK EVENT CONTINUITY DETERMINATION DEVICE, AND NON-TRANSITORY COMPUTER-READABLE RECORDING MEDIUM

CROSS REFERENCE TO RELATED APPLICATIONS

This is a continuation application of PCT International Application No. PCT/JP2021/025103 filed on Jul. 2, 2021, designating the United States of America, which is based on and claims priority of U.S. Provisional Patent Application No. 63/116,479 filed on Nov. 20, 2020. The entire disclosures of the above-identified applications, including the specifications, drawings and claims are incorporated herein by reference in their entirety.

FIELD

The present disclosure relates to a method for analyzing cyber attacks on a network.

BACKGROUND

Techniques are known which analyze cyber attacks (also called simply "attacks" hereinafter) on in-vehicle networks installed in vehicles (see PTL 1, for example).

CITATION LIST

Patent Literature

PTL 1: Japanese Unexamined Patent Application Publication No. 2015-026252

SUMMARY

Technical Problem

Attacks on in-vehicle networks include attacks in which the time interval between the time of intrusion into the in-vehicle network and the time of the attack on the attack target is relatively large (such attacks will be called "latent attacks" hereinafter).

Thus far, for a single latent attack, two different vehicle attack events have sometimes been determined to have occurred, namely a first vehicle attack event which has occurred during a time period near the time of the attack on the attack target, and a second vehicle attack event which has occurred before the first attack event in a time period near the time of intrusion into the in-vehicle network.

There have thus been cases where latent attacks could not be analyzed correctly.

However, even in such a case, if continuity between the attack path of the first vehicle attack event and the attack path of the second vehicle attack event can be determined, the first vehicle attack event and the second vehicle attack event determined for the one latent attack can be considered to be a single vehicle attack event, and the attack involving that vehicle attack event can then be analyzed.

Accordingly, an object of the present disclosure is to provide a vehicle attack event continuity determination method and the like capable of determining continuity between a first vehicle attack event, and a second vehicle attack event which occurred before the first vehicle attack event, that have occurred in an in-vehicle network.

Solution to Problem

A vehicle attack event continuity determination method according to one aspect of the present disclosure includes: obtaining first vehicle attack event information pertaining to a first vehicle attack event which has occurred in an in-vehicle network, second vehicle attack event information pertaining to a second vehicle attack event which has occurred in the in-vehicle network before the first vehicle attack event, and in-vehicle network information indicating a configuration of the in-vehicle network; determining whether there is continuity between the first vehicle attack event and the second vehicle attack event based on the first vehicle attack event information, the second vehicle attack event information, and the in-vehicle network information; and outputting a result of the determining.

A vehicle attack event continuity determination device according to one aspect of the present disclosure includes: an obtainer that obtains first vehicle attack event information pertaining to a first vehicle attack event which has occurred in an in-vehicle network, second vehicle attack event information pertaining to a second vehicle attack event which has occurred in the in-vehicle network before the first vehicle attack event, and in-vehicle network information indicating a configuration of the in-vehicle network; a determiner that determines whether there is continuity between the first vehicle attack event and the second vehicle attack event based on the first vehicle attack event information, the second vehicle attack event information, and the in-vehicle network information; and an outputter that outputs a result of the determining.

A non-transitory computer-readable recording medium according to one aspect of the present disclosure is a non-transitory computer-readable recording medium having recorded thereon a program for causing a computer to execute vehicle attack event continuity determination processing, the vehicle attack event continuity determination processing including: obtaining first vehicle attack event information pertaining to a first vehicle attack event which has occurred in an in-vehicle network, second vehicle attack event information pertaining to a second vehicle attack event which has occurred in the in-vehicle network before the first vehicle attack event, and in-vehicle network information indicating a configuration of the in-vehicle network; determining whether there is continuity between the first vehicle attack event and the second vehicle attack event based on the first vehicle attack event information, the second vehicle attack event information, and the in-vehicle network information; and outputting a result of the determining.

Advantageous Effects

According to the vehicle attack event continuity determination method and the like according to one aspect of the present disclosure, continuity can be determined between a first vehicle attack event, and a second vehicle attack event which occurred before the first vehicle attack event, that have occurred in an in-vehicle network.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3 is a schematic diagram illustrating an example of an anomaly detector detecting an anomaly according to Embodiment 1.

FIG. 4 is a schematic diagram illustrating an example of vehicle attack event information according to Embodiment 1.

FIG. 5 is a schematic diagram illustrating an example of vehicle function event information according to Embodiment 1.

FIG. 7 is a schematic diagram illustrating an example of a vehicle attack event history according to Embodiment 1.

FIG. 8 is a schematic diagram illustrating an example of a vehicle function event history according to Embodiment 1.

FIG. 9 is a schematic diagram illustrating an example of in-vehicle network information according to Embodiment 1.

FIG. 19 is a schematic diagram illustrating an example of an image displayed by an image display device according to Embodiment 2.

DESCRIPTION OF EMBODIMENTS

Figure 1:
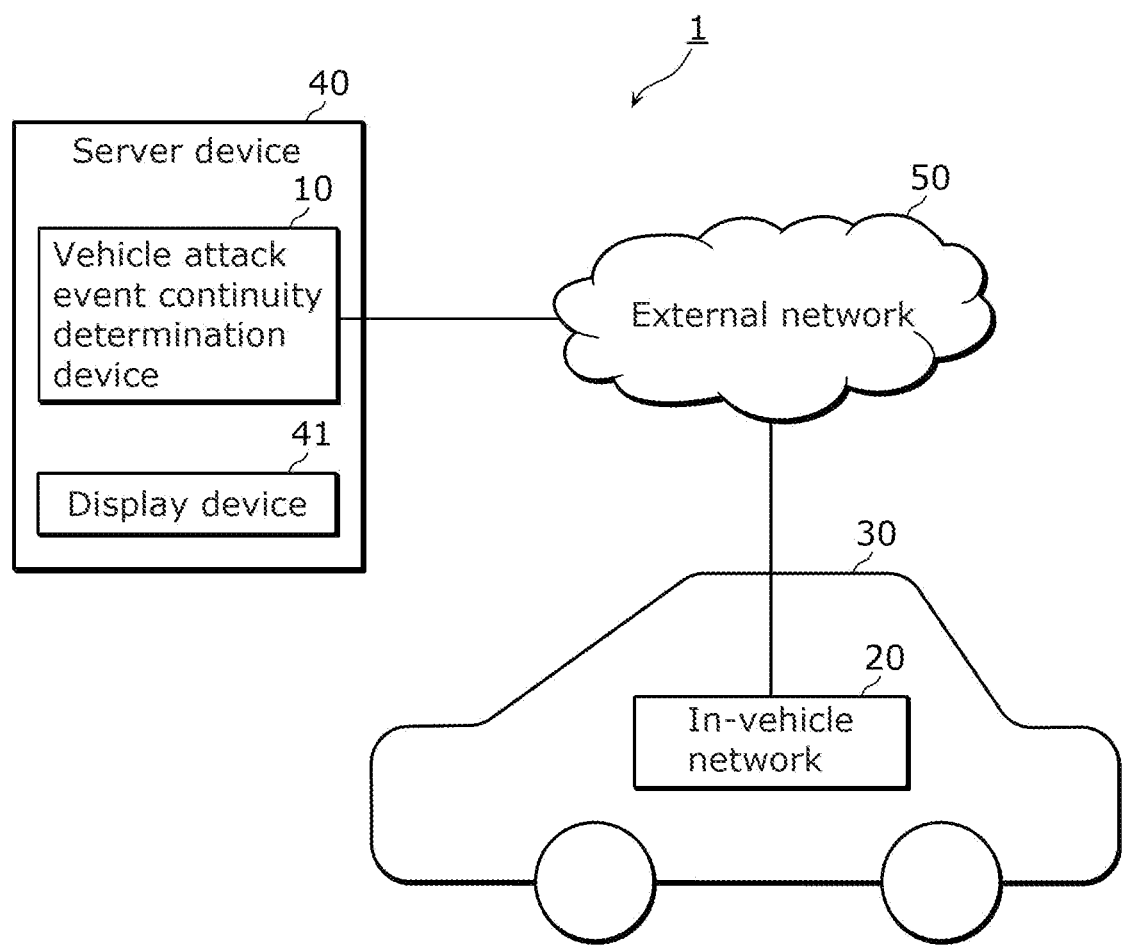
FIG. 1 is a block diagram illustrating an example of the configuration of an attack monitoring system according to Embodiment 1.

Circumstances Leading to One Aspect of Present Disclosure

As described above, in the past, there have been cases where latent attacks could not be analyzed correctly.

The inventors therefore diligently studied and experimented with methods for correctly analyzing latent attacks.

As a result, the inventors discovered that if continuity between a first vehicle attack event and a second vehicle attack event which occurred before the first vehicle attack event in the in-vehicle network can be determined, the first vehicle attack event and the second vehicle attack event determined for the one latent attack can be considered to be a single vehicle attack event, and the attack involving that vehicle attack event can then be analyzed.

Based on this knowledge, the inventors made further studies and experiments, and arrived at the vehicle attack event continuity determination method, vehicle attack event continuity determination device, and non-transitory computer-readable recording medium according to the present disclosure as described below.

A vehicle attack event continuity determination method according to one aspect of the present disclosure includes: obtaining first vehicle attack event information pertaining to a first vehicle attack event which has occurred in an in-vehicle network, second vehicle attack event information pertaining to a second vehicle attack event which has occurred in the in-vehicle network before the first vehicle attack event, and in-vehicle network information indicating a configuration of the in-vehicle network; determining whether there is continuity between the first vehicle attack event and the second vehicle attack event based on the first vehicle attack event information, the second vehicle attack event information, and the in-vehicle network information; and outputting a result of the determining.

According to this vehicle attack event continuity determination method, continuity can be determined between a first vehicle attack event, and a second vehicle attack event which occurred before the first vehicle attack event, that have occurred in an in-vehicle network.

Additionally, the obtaining may further include obtaining third vehicle attack event information pertaining to a third vehicle attack event which has occurred in the in-vehicle network before the second vehicle attack event; and the determining may further include, when it has been determined that there is no continuity between the first vehicle attack event and the second vehicle attack event, determining whether there is continuity between the first vehicle attack event and the third vehicle attack event based on the first vehicle attack event information, the third vehicle attack event information, and the in-vehicle network information.

Additionally, the in-vehicle network may include a plurality of anomaly detectors; the first vehicle attack event information may include information indicating one or more first anomaly detectors, among the plurality of anomaly detectors, that have detected an anomaly in the first vehicle attack event; the second vehicle attack event information may include information indicating one or more second anomaly detectors, among the plurality of anomaly detectors, that have detected an anomaly in the second vehicle attack event; and the determining may include calculating an attack path in the first vehicle attack event, calculating a non-detecting anomaly detector which has not detected an anomaly in the first attack event and which is located upstream from the one or more first anomaly detectors in the attack path, and determining that there is continuity between the first vehicle attack event and the second vehicle attack event when the non-detecting anomaly detector is an endpoint anomaly detector, among the one or more second anomaly detectors, that has detected an anomaly at a latest time.

Additionally, the determining may include determining the continuity for the second vehicle attack event that has occurred within a first predetermined period from an occurrence time of the first vehicle attack event.

Additionally, the obtaining may further include obtaining vehicle function event information pertaining to a vehicle function event that has occurred in a vehicle in which the in-vehicle network is installed; and the determining includes determining the continuity also based on the vehicle function event information.

Additionally, the vehicle function event information may further include a vehicle function usage rate pertaining to a total number of times or a duration for which a first vehicle function event has occurred within a third predetermined period into the past from a first time that is an earliest time at which the one or more first anomaly detectors have detected an anomaly, the first vehicle function event being identical to a vehicle function event that has occurred within a second predetermined period into the past from the first time, and the third predetermined period being longer than the second predetermined period; the vehicle attack event continuity determination method may further include updating the first predetermined period based on the vehicle function usage rate; and the determining may include determining the continuity using the first predetermined period updated in the updating.

Additionally, the updating may include updating the first predetermined period such that (1) the first predetermined period is not changed when the first vehicle function event has not occurred within the third predetermined period into the past from the first time, (2) the first predetermined period is shortened when the first vehicle function event has occurred within the third predetermined period into the past from the first time and for a total number of times or a duration that is at least a predetermined threshold, or (3) the first predetermined period is lengthened when the first vehicle function event has occurred within the third predetermined period into the past from the first time and for a total number of times or a duration that is less than the predetermined threshold.

Additionally, the first vehicle function event may be an engine running event in which an engine of the vehicle is running.

Additionally, the first vehicle function event may be an automatic driving activation event in which automatic driving of the vehicle is active.

Additionally, the first vehicle function event may be a high-speed travel event in which the vehicle travels at a high speed.

Additionally, the first vehicle function event may be a software update event of updating software of the vehicle.

Additionally, the vehicle attack event continuity determination method may further include merging the first vehicle attack event and the second vehicle attack event when it is determined in the determining that there is continuity.

Additionally, the vehicle attack event continuity determination method may further include, when the first vehicle attack event and the second vehicle attack event have been merged into a post-merger vehicle attack event in the merging, calculating a reliability level of the post-merger vehicle attack event based on the first vehicle attack event information and the second vehicle attack event information, and the outputting may further include outputting the reliability level.

A vehicle attack event continuity determination device according to one aspect of the present disclosure includes: an obtainer that obtains first vehicle attack event information pertaining to a first vehicle attack event which has occurred in an in-vehicle network, second vehicle attack event information pertaining to a second vehicle attack event which has occurred in the in-vehicle network before the first vehicle attack event, and in-vehicle network information indicating a configuration of the in-vehicle network; a determiner that determines whether there is continuity between the first vehicle attack event and the second vehicle attack event based on the first vehicle attack event information, the second vehicle attack event information, and the in-vehicle network information; and an outputter that outputs a result of the determining.

According to the vehicle attack event continuity determination device configured as described above, continuity can be determined between a first vehicle attack event, and a second vehicle attack event which occurred before the first vehicle attack event, that have occurred in an in-vehicle network.

A non-transitory computer-readable recording medium according to one aspect of the present disclosure is a non-transitory computer-readable recording medium having recorded thereon a program for causing a computer to execute vehicle attack event continuity determination processing, the vehicle attack event continuity determination processing including: obtaining first vehicle attack event information pertaining to a first vehicle attack event which has occurred in an in-vehicle network, second vehicle attack event information pertaining to a second vehicle attack event which has occurred in the in-vehicle network before the first vehicle attack event, and in-vehicle network information indicating a configuration of the in-vehicle network; determining whether there is continuity between the first vehicle attack event and the second vehicle attack event based on the first vehicle attack event information, the second vehicle attack event information, and the in-vehicle network information; and outputting a result of the determining.

According to this non-transitory computer-readable recording medium, continuity can be determined between a first vehicle attack event, and a second vehicle attack event which occurred before the first vehicle attack event, that have occurred in an in-vehicle network.

Specific examples of the vehicle attack event continuity determination method and the like according to an aspect of the present disclosure will be described hereinafter with reference to the drawings. Each of the following embodiments describes a specific example of the present disclosure. As such, the numerical values, shapes, constituent elements, arrangements and connection states of constituent elements, steps, orders of steps, and the like in the following embodiments are merely examples, and are not intended to limit the present disclosure. Additionally, the drawings are schematic diagrams, and are not necessarily exact illustrations. Configurations that are substantially the same are given the same reference signs in the drawings, and redundant descriptions will be omitted or simplified.

Embodiment 1

A vehicle attack event continuity determination device according to Embodiment 1 will be described hereinafter. This vehicle attack event continuity determination device is a device that determines continuity between a first vehicle attack event, and a second vehicle attack event which occurred before the first vehicle attack event, that have occurred in an in-vehicle network installed in a vehicle.

Configuration

FIG. 1 is a block diagram illustrating an example of the configuration of attack monitoring system 1 which uses vehicle attack event continuity determination device 10 according to an embodiment to monitor attacks on in-vehicle network 20 installed in vehicle 30.

As illustrated in FIG. 1, attack monitoring system 1 is configured including server device 40, vehicle 30, in-vehicle network 20, and external network 50.

Server device 40 is what is known as a computer device, and includes a processor (not shown), a memory (not shown), a communication interface (not shown), a storage device (not shown), and a display (not shown).

Server device 40 realizes vehicle attack event continuity determination device 10 and display device 41 by the processor executing programs stored in the memory.

Vehicle 30 has a communication function, and is provided with in-vehicle network 20. Vehicle 30 is an automobile, for example.

External network 50 is a wide-area network such as the Internet, and includes vehicle attack event continuity determination device 10 and in-vehicle network 20 as connection destinations.

Figure 2:
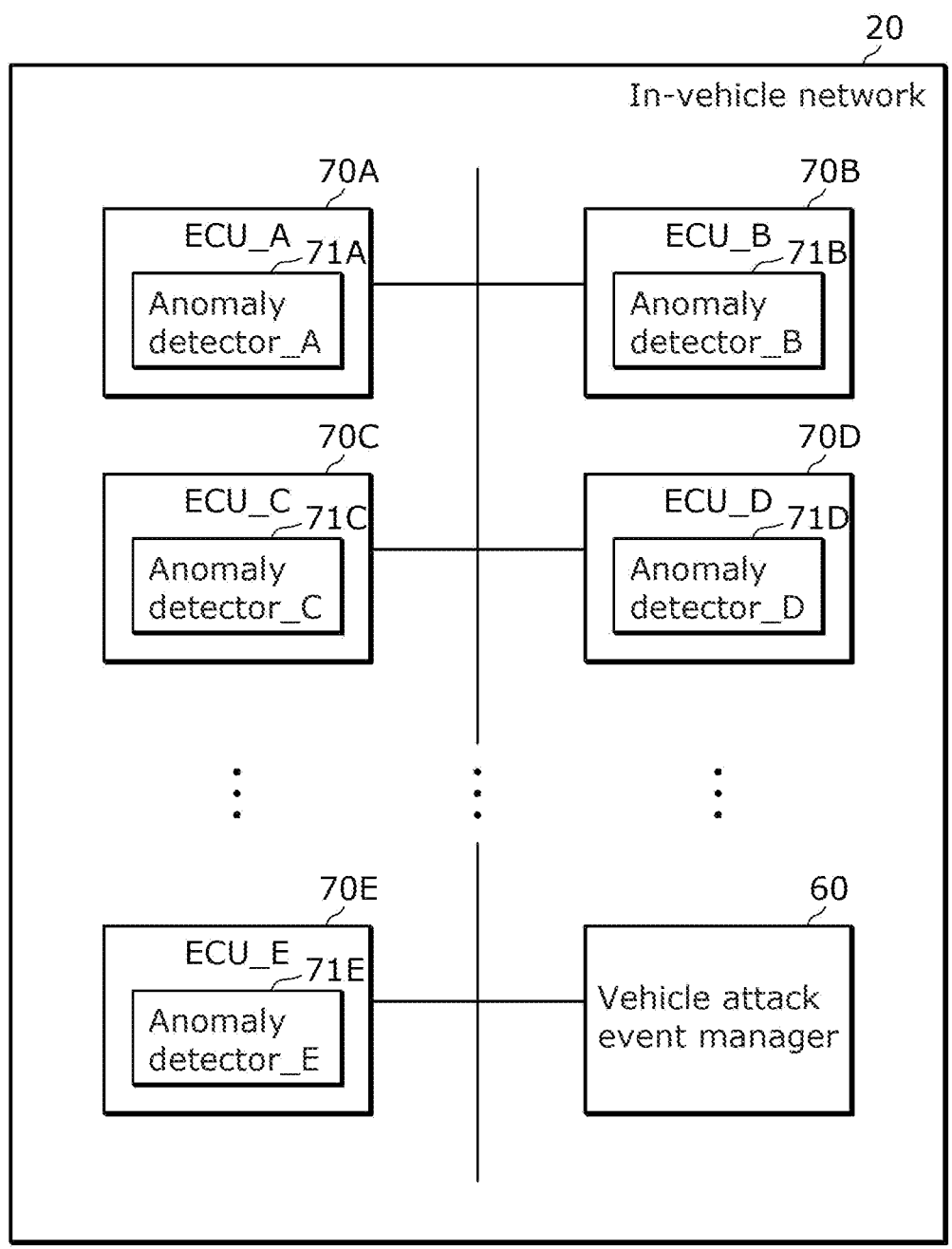
FIG. 2 is a block diagram illustrating an example of the configuration of an in-vehicle network according to Embodiment 1.

FIG. 2 is a block diagram illustrating an example of the configuration of in-vehicle network 20.

As illustrated in FIG. 2, in-vehicle network 20 is configured including a plurality of Electronic Control Units (ECUs), and vehicle attack event manager 60.

Here, in FIG. 2, the plurality of ECUs correspond to ECU_A 70A, ECU_B 70B, ECU_C 70C, ECU_D 70D, and ECU_E 70E. Each of the plurality of ECUs may also be referred to simply as "ECU 70" hereinafter.

The plurality of ECUs 70 include, for example, an ECU that controls the engine of vehicle 30, an ECU that controls automatic driving of vehicle 30, an ECU that controls an air conditioner installed in vehicle 30, and the like.

Each ECU 70 includes an anomaly detector that detects an anomaly in ECU 70. Here, ECU_A 70A includes anomaly detector_A 71A, ECU_B 70B includes anomaly detector_B 71B, ECU_C 70C includes anomaly detector_C 71C, ECU_D 70D includes anomaly detector_D 71D, and ECU_E 70E includes anomaly detector_E 71E. The anomaly detector included in each ECU 70 may also be referred to simply as "anomaly detector 71" hereinafter.

The following will describe the types of detections of anomalies in ECU 70 by anomaly detector 71 as including a detection of an anomalous operation in ECU 70 (also called "IDS" hereinafter) and a defense error against an attack on ECU 70.

Upon detecting an anomaly in ECU 70, anomaly detector 71 transmits anomaly detection information to vehicle attack event manager 60. Here, the anomaly detection information is information including an anomaly detection type indicating the type of the anomaly, a detection time indicating the time the anomaly was detected, and an ECU name indicating ECU 70 for which the anomaly was detected.

FIG. 3 is a schematic diagram indicating an example of the plurality of anomaly detectors 71 detecting anomalies for the corresponding ECUs 70 in a case where there has been an attack on in-vehicle network 20.

The arrows (→) in FIG. 3 indicate connection relationships between ECUs 70 in in-vehicle network 20. The "depth" in FIG. 3 indicates the degree of adverse impact on vehicle 30 which can occur due to the detected anomaly. Here, a deeper location in the hierarchy (a higher number in the hierarchy) indicates a greater degree of adverse impact.

The example in FIG. 3 illustrates the following. First, after an attack is carried out on ECU_A 70A, an attack is carried out on ECU_C 70C, which is the connection destination of ECU_A 70A; furthermore, an attack is then carried out on ECU_D 70D, which is the connection destination of ECU_C 70C. In this case, (1) anomaly detector_A 71A has detected a defense error for the attack on ECU_A 70A at time YY1 (year): MM1 (month): DD1 (day): HH1 (hour): MM1 (minute): SS1 (second); then, (2) anomaly detector_A 71A has detected an IDS for the attack on ECU_A 70A at time YY2 (year): MM2 (month): DD2 (day): HH2 (hour): MM2 (minute): SS2 (second); then, (3) anomaly detector_C 71C has detected an IDS for the attack on ECU_C 70C at time YY3 (year): MM3 (month): DD3 (day): HH3 (hour): MM3 (minute): SS3 (second); and finally, (4) anomaly detector_D 71D has detected a defense error for the attack on ECU_D 70D at time YY4 (year): MM4 (month): DD4 (day): HH4 (hour): MM4 (minute): SS4 (second).

Returning to FIG. 2, descriptions of in-vehicle network 20 will be continued.

Vehicle attack event manager 60 receives the anomaly detection information transmitted from anomaly detector 71.

When a plurality of pieces of the anomaly detection information for which the detection times have differences within predetermined period TA (e.g., five minutes) are received, vehicle attack event manager 60 determines that, in the in-vehicle network 20, a vehicle attack event has occurred which is constituted by detections of anomalies in ECUs 70 indicated by the plurality of pieces of anomaly detection information. Vehicle attack event manager 60 then generates vehicle attack event information based on the plurality of pieces of anomaly detection information.

FIG. 4 is a schematic diagram illustrating an example of the vehicle attack event information generated by vehicle attack event manager 60.

As illustrated in FIG. 4, the vehicle attack event information is information configured by associating the anomaly detection type, the detection time, the ECU name, and a detection number identifying the detection of the anomaly with each detection of an anomaly in ECU 70 included in a single vehicle attack event.

It can be seen, from the vehicle attack event information illustrated in FIG. 4, that the vehicle attack event indicated by the vehicle attack event information is an event constituted by the detection of an anomaly having an anomaly detection type of IDS in ECU_C 70C at a detection time of 2020:4:1:12:00:36 and the detection of an anomaly having an anomaly detection type of a defense error in ECU_D 70D at a detection time of 2020:4:1:12:00:37.

Returning to FIG. 2, descriptions of in-vehicle network 20 will be continued.

Upon generating the vehicle attack event information, vehicle attack event manager 60 examines vehicle function events occurring in vehicle 30 within predetermined period TB (e.g., ten minutes) into the past from a first time which is the earliest among the detection times included in the generated vehicle attack event information. Here, a "vehicle function event" is an event in which any one of the functions of vehicle 30 is executed. For example, the vehicle function events include an engine running event indicating a state in which the engine of vehicle 30 is running; an engine start event of starting the engine of vehicle 30; an automatic driving activation event indicating a state in which automatic driving of vehicle 30 is active; an automatic driving start event of starting automatic driving of vehicle 30; a high-speed travel event indicating a state in which vehicle 30 is traveling at a high speed; a high-speed travel start event of vehicle 30 starting high-speed travel; a software update event in which software installed in vehicle 30 is updated; and the like.

When there is a corresponding vehicle function event, vehicle attack event manager 60 calculates a vehicle function usage rate for the number of times or the duration of the same vehicle function event occurring within predetermined period TC (e.g., one week) into the past from the first time.

For example, if the vehicle function event is an engine running event, the vehicle function usage rate may be an engine running usage rate indicating the ratio of a period for which the engine is running relative to predetermined period TB, or may be a continuous running time for the engine. If the vehicle function event is an engine start event, the vehicle function usage rate may, for example, be an engine start frequency indicating the number of times the engine has been started in predetermined period TB. If the vehicle function event is an automatic driving activation event, the vehicle function usage rate may, for example, be an automatic driving activation usage rate indicating the ratio of a period the automatic driving is started up for relative to predetermined period TB, or may be a continuous startup time for the automatic driving. If the vehicle function event is an automatic driving start event, the vehicle function usage rate may, for example, be an automatic driving start frequency indicating the number of times automatic driving has been started in predetermined period TB. If the vehicle function event is a high-speed travel event, the vehicle function usage rate may, for example, be a high-speed travel usage rate indicating the ratio of a period of travel at high speed relative to predetermined period TB, or may be a continuous high-speed travel time. If the vehicle function event is a high-speed travel start event, the vehicle function usage rate may, for example, be a high-speed travel start frequency indicating the number of times high-speed travel has been started in predetermined period TB. If the vehicle function event is a software update event, the vehicle function usage rate may, for example, be a software update frequency indicating the number of times the software has been updated in predetermined period TB.

Upon calculating the vehicle function usage rate, vehicle attack event manager 60 generates vehicle function event information based on the corresponding vehicle function event and the generated vehicle function event.

FIG. 5 is a schematic diagram illustrating an example of the vehicle function event information generated by vehicle attack event manager 60.

As illustrated in FIG. 5, the vehicle function event information is information configured by associating the corresponding vehicle function event with the vehicle function usage rate of that vehicle function event.

It can be seen, from the vehicle function event information illustrated in FIG. 5, that the corresponding vehicle function event is an engine running event, and the ratio of the period for which the engine is running relative to predetermined period TB is 60%.

Returning to FIG. 2, descriptions of in-vehicle network 20 will be continued.

Upon generating the vehicle attack event information and the vehicle function event information, vehicle attack event manager 60 transmits the generated vehicle attack event information and the generated vehicle function event information to vehicle attack event continuity determination device 10.

Vehicle attack event manager 60 is realized by, for example, the processor (not shown) included in in-vehicle network 20 executing a program stored in the memory (not shown) included in in-vehicle network 20.

Figure 6:
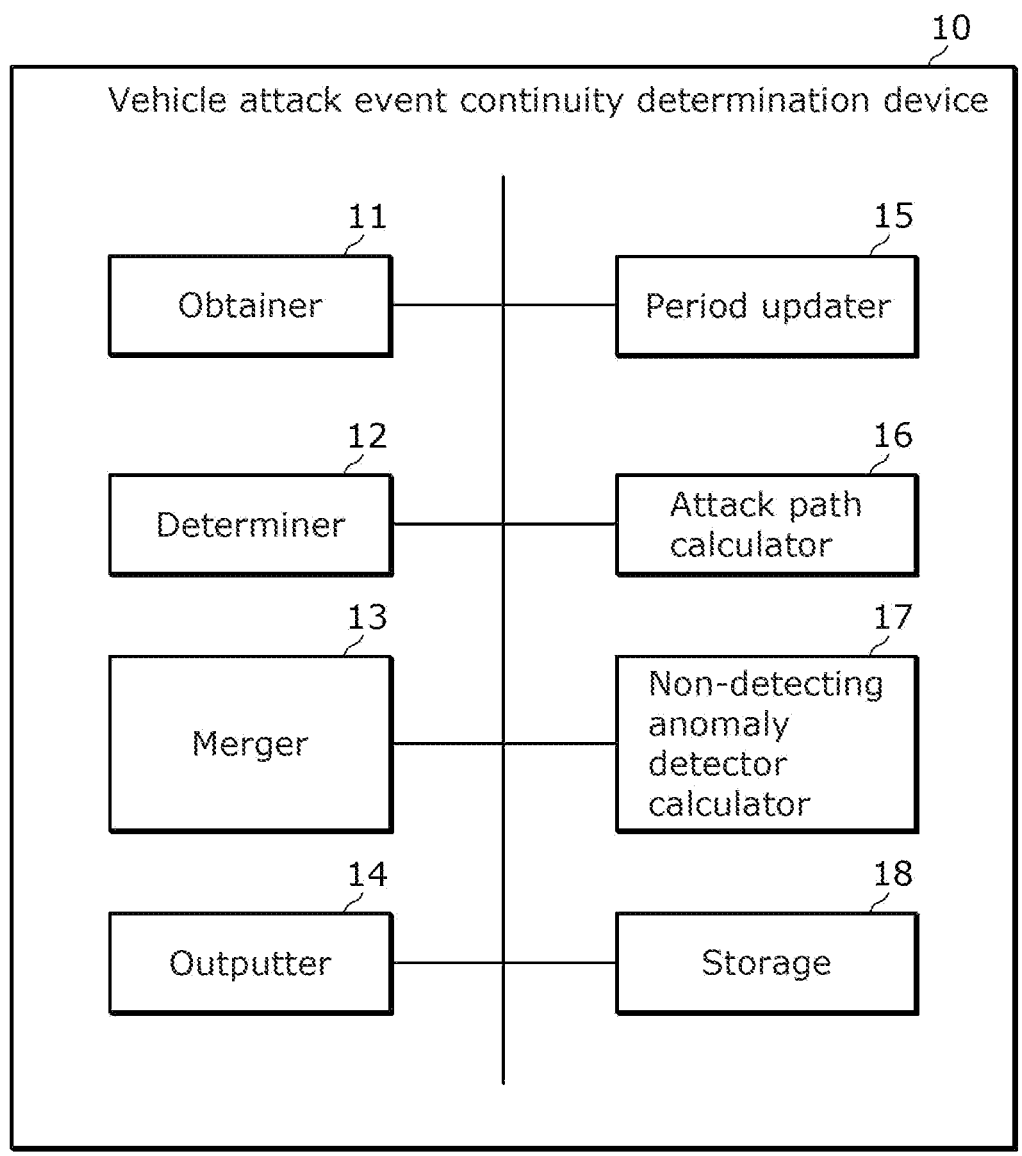
FIG. 6 is a block diagram illustrating an example of the configuration of a vehicle attack event continuity determination device according to Embodiment 1.

FIG. 6 is a block diagram illustrating an example of the configuration of vehicle attack event continuity determination device 10.

As illustrated in FIG. 6, vehicle attack event continuity determination device 10 includes obtainer 11, determiner 12, merger 13, outputter 14, period updater 15, attack path calculator 16, non-detecting anomaly detector calculator 17, and storage 18.

Obtainer 11 obtains the vehicle attack event information and the vehicle function event information transmitted from vehicle attack event manager 60.

Upon obtaining new vehicle attack event information, obtainer 11 updates a vehicle attack event history stored in storage 18.

FIG. 7 is a schematic diagram illustrating an example of the vehicle attack event history stored in storage 18.

As illustrated in FIG. 7, the vehicle attack event history is configured by associating the vehicle attack event information, a vehicle attack event information reception time indicating the time when that vehicle attack event information was received, a vehicle number identifying vehicle 30 that includes vehicle attack event manager 60 which transmitted that vehicle attack event information, and a vehicle attack event number identifying that vehicle attack event information, for each piece of vehicle attack event information obtained by obtainer 11 in the past.

Here, each constituent element constituting vehicle attack event continuity determination device 10 performs various types of processing using the vehicle attack event information reception time at which obtainer 11 received the vehicle attack event information as an occurrence time of the vehicle attack event indicated by that vehicle attack event information.

Returning to FIG. 6, descriptions of vehicle attack event continuity determination device 10 will be continued.

Upon obtaining new vehicle function event information, obtainer 11 updates a vehicle function event history stored in storage 18.

FIG. 8 is a schematic diagram illustrating an example of the vehicle function event history stored in storage 18.

As illustrated in FIG. 8, the vehicle function event history is configured by associating the vehicle function event information, a vehicle function event information reception time indicating the time when that vehicle function event information was received, a vehicle number identifying vehicle 30 that includes vehicle attack event manager 60 which transmitted that vehicle function event information, and a vehicle attack event number identifying the vehicle attack event corresponding to that vehicle function event information, for each piece of vehicle function event information obtained by obtainer 11 in the past.

Returning to FIG. 6, descriptions of vehicle attack event continuity determination device 10 will be continued.

In addition to the vehicle attack event history and the vehicle function event history, storage 18 stores in-vehicle network information indicating the configuration of in-vehicle network 20.

FIG. 9 is a schematic diagram illustrating an example of the in-vehicle network information stored in storage 18.

In FIG. 9, the "connection origin ECU entry point flag" is a flag which is "true" (e.g., a logical value of 1) when the connection origin ECU is an ECU that is an entry point and "false" (e.g., a logical value of 0) when the connection origin ECU is not an ECU that is an entry point. Here, "entry point"

means the point of intrusion into in-vehicle network 20 in an attack carried out on in-vehicle network 20.

Storage 18 may, for example, store the in-vehicle network information in advance; or, for example, obtainer 11 may obtain the in-vehicle network information transmitted from vehicle attack event manager 60, and storage 18 may store the in-vehicle network information obtained by obtainer 11.

Returning to FIG. 6, descriptions of vehicle attack event continuity determination device 10 will be continued.

Attack path calculator 16 calculates, for a vehicle attack event included in the vehicle attack event history stored in storage 18, an attack path including the entry point of the attack in that vehicle attack event and the attack target of the attack. Here, "attack target" means the target of an attack being carried out on in-vehicle network 20.

To be more specific, by referring to the in-vehicle network information stored in storage 18, attack path calculator 16 calculates paths, in in-vehicle network 20, capable of connecting a group of entry points which can be the entry point to a group of attack targets which can be the attack target, and then calculates, as the attack path, a path, among the calculated paths, having the lowest number of anomaly detectors 71 that have not detected an anomaly in the vehicle attack event in question.

Non-detecting anomaly detector calculator 17 calculates, for the attack path calculated by attack path calculator 16, a non-detecting anomaly detector which has not detected an anomaly and which is located upstream in the attack path from anomaly detector 71 that has detected an anomaly.

Determiner 12 determines continuity between a first vehicle attack event indicated by first vehicle attack event information, and a second vehicle attack event indicated by second vehicle attack event information and occurring before the first vehicle attack event, which are included in the vehicle attack event history stored in storage 18.

More specifically, determiner 12 determines that the first vehicle attack event and the second vehicle attack event have continuity if a non-detecting anomaly detector in the first vehicle attack event matches anomaly detector 71, among anomaly detectors 71 that have detected an anomaly in the second vehicle attack event, that has the latest time of detecting the anomaly, and determines that the first vehicle attack event and the second vehicle attack event do not have continuity if not.

At this time, determiner 12 may determine the continuity for a second vehicle attack event occurring within predetermined period T1 from the occurrence time of the first vehicle attack event.

Additionally, the first vehicle attack event and the second vehicle attack event are determined not to have continuity, determiner 12 may further determine continuity between the first vehicle attack event indicated by the first vehicle attack event information, and a third vehicle attack event indicated by third vehicle attack event information and occurring before the second vehicle attack event, which are included in the vehicle attack event history stored in storage 18.

Period updater 15 updates predetermined period T1 based on the vehicle function usage rate included in the vehicle function event information corresponding to the first vehicle attack event, among the vehicle function events included in the vehicle function event history stored in storage 18.

More specifically, period updater 15 updates predetermined period T1 in the vehicle function event information corresponding to the first vehicle attack event information such that: (1) when a vehicle function event, which is the same as a vehicle function event that occurred within predetermined period TB into the past from the first time, has not occurred within predetermined period TC into the past from the first time, predetermined period T1 is not changed; (2) when a vehicle function event, which is the same as a vehicle function event that occurred within predetermined period TB into the past from the first time, has occurred within predetermined period TC into the past from the first time and is occurring a number of times or for a duration that is at least a predetermined threshold, predetermined period T1 is shortened; and (3) when a vehicle function event, which is the same as a vehicle function event that occurred within predetermined period TB into the past from the first time, has occurred within predetermined period TC into the past from the first time and is occurring a number of times or for a duration that is less than the predetermined threshold, predetermined period T1 is lengthened.

Merger 13 merges the first vehicle attack event and the second vehicle attack event when determiner 12 has determined that the first vehicle attack event and the second vehicle attack event have continuity.

Outputter 14 outputs a result of the determination by determiner 12. More specifically, outputter 14 outputs, to display device 41, a first display control signal which includes the determination result and which causes display device 41 to display the determination result.

Operations

Operations performed by vehicle attack event continuity determination device 10 having the above-described configuration will be described next with reference to the drawings.

Figure 10:
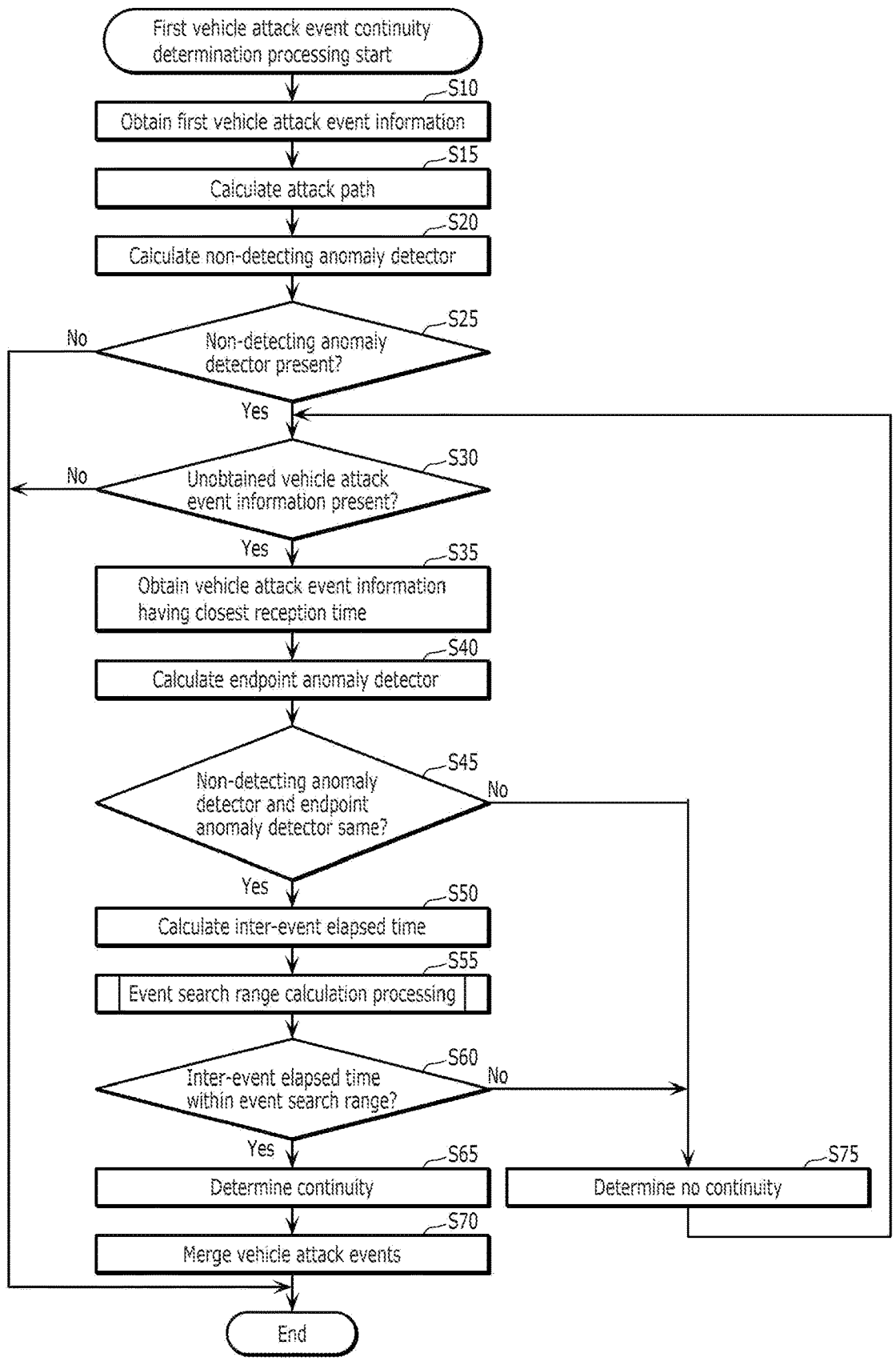
FIG. 10 is a flowchart illustrating first vehicle attack event continuity determination processing according to Embodiment 1.

FIG. 10 is a flowchart illustrating first vehicle attack event continuity determination processing performed by vehicle attack event continuity determination device 10. This first vehicle attack event continuity determination processing is processing for determining continuity between the first vehicle attack event and the second vehicle attack event which occurred before the first vehicle attack event.

The first vehicle attack event continuity determination processing is started when, for example, a user using vehicle attack event continuity determination device 10 designates a first vehicle attack event for which continuity is to be determined to vehicle attack event continuity determination device 10, and performs an operation for executing the first vehicle attack event continuity determination processing.

As illustrated in FIG. 10, when the first vehicle attack event continuity determination processing is started, attack path calculator 16 obtains the first vehicle attack event information indicating the first vehicle attack event from the vehicle attack event history stored in storage 18 (step S10).

Upon obtaining the first vehicle attack event information, attack path calculator 16 calculates, for the first vehicle attack event, an attack path including the entry point of the attack in that vehicle attack event and the attack target of the attack (step S15).

Once the attack path is calculated, non-detecting anomaly detector calculator 17 calculates a non-detecting anomaly detector which has not detected an anomaly and which is located upstream in the attack path from anomaly detector 71 that has detected an anomaly (step S20). Non-detecting anomaly detector calculator 17 then examines whether there is a non-detecting anomaly detector in the calculation of the non-detecting anomaly detector (step S25).

If, in the processing of step S25, there is a non-detecting anomaly detector (step S25: Yes), determiner 12 examines whether vehicle attack event information which has not yet been obtained and which indicates a vehicle attack event that occurred before the first vehicle attack event (also called "unobtained vehicle attack event information") is present in the vehicle attack event history stored in storage 18 (step S30).

Here, the "unobtained vehicle attack event information" refers to vehicle attack event information indicating a vehicle attack event which occurred before the first vehicle attack event and which has not yet been obtained through the processing of step S30, in the processing loop formed when a determination of "Yes" is made in the processing of step S30 and a determination of "No" is made in the processing of step S45 (described later), and the processing loop formed when a determination of "Yes" is made in the processing of step S30, a determination of "Yes" is made in the processing of step S45 (described later), and a determination of "No" is then made in the processing of step S60 (described later).

When the unobtained vehicle attack event information is present in the processing of step S30 (step S30: Yes), determiner 12 obtains, from the vehicle attack event history stored in storage 18, the unobtained vehicle attack event information including a reception time closest to the reception time included in the first vehicle attack event information (also called "obtained vehicle attack event information" hereinafter) (step S35).

Upon obtaining the obtained vehicle attack event information, determiner 12 calculates an endpoint anomaly detector, which is anomaly detector 71 having the latest time of detecting an anomaly among anomaly detectors 71 which have detected an anomaly in the vehicle attack event indicated by the obtained vehicle attack event information (also called an "obtained vehicle attack event" hereinafter) (step S40).

Upon calculating the endpoint anomaly detector, determiner 12 examines whether the non-detecting anomaly detector and the endpoint anomaly detector match (step S45).

If the non-detecting anomaly detector and the endpoint anomaly detector match in the processing of step S45 (step S45: Yes), determiner 12 calculates an inter-event elapsed time, which is the time that has elapsed between the occurrence time of the obtained vehicle attack event (here, the reception time of the obtained vehicle attack event information) and the occurrence time of the first vehicle attack event (here, the reception time of the first vehicle attack event information) (step S50).

Once the inter-event elapsed time is calculated, period updater 15 executes event search range calculation processing for updating predetermined period T1 (also called an "event search range" hereinafter) (step S55).

Figure 11:
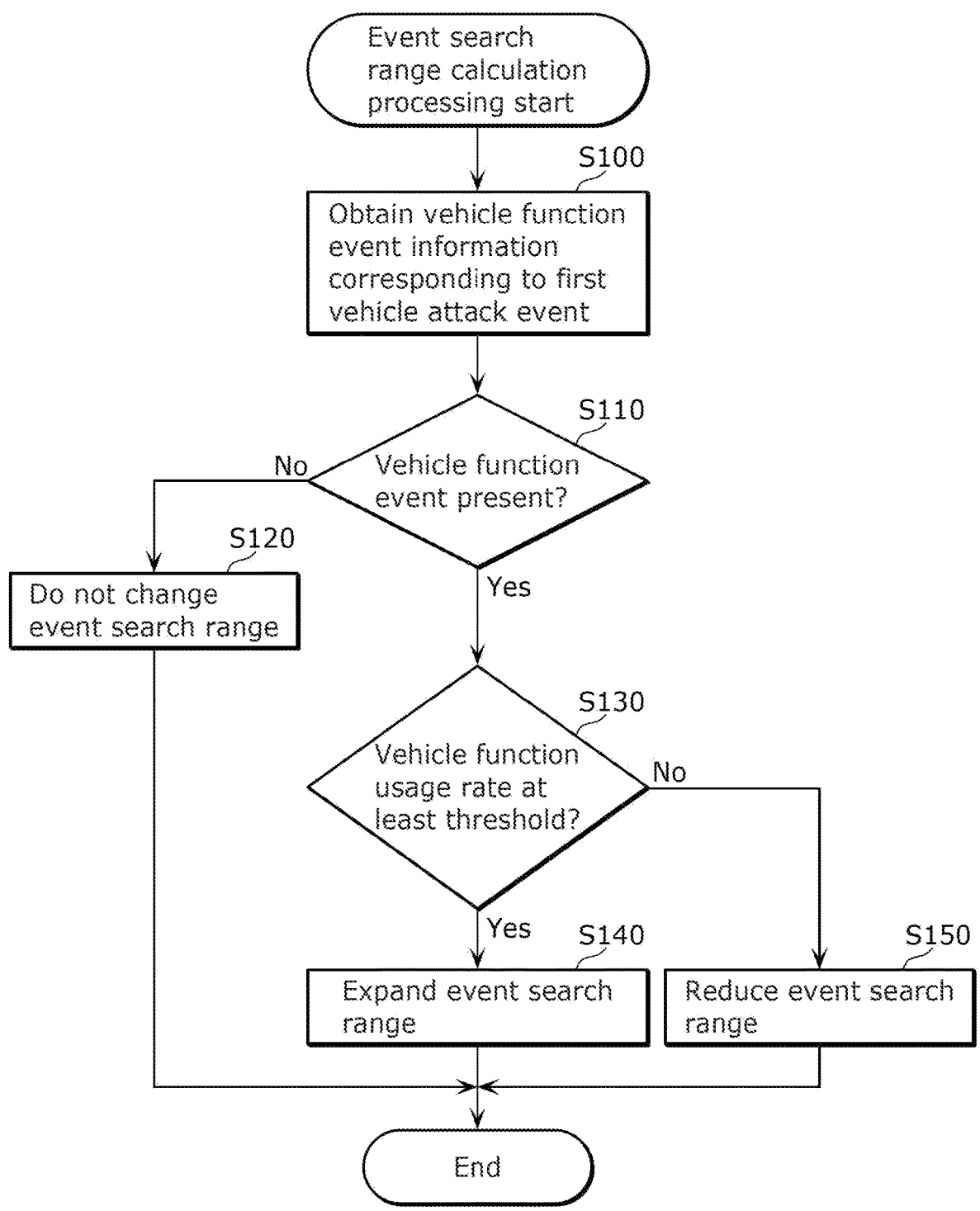
FIG. 11 is a flowchart illustrating event search range calculation processing according to Embodiment 1.

FIG. 11 is a flowchart illustrating the event search range calculation processing executed by period updater 15.

As illustrated in FIG. 11, when the event search range calculation processing is started, period updater 15 obtains the vehicle function event information corresponding to the first vehicle attack event from among the vehicle function events included in the vehicle function event history stored in storage 18 (step S100).

Then, period updater 15 examines whether a vehicle function event is present in the obtained vehicle function event information (step S110).

If a vehicle function event is present in the processing of step S110 (step S110: Yes), period updater 15 examines whether the vehicle function usage rate included in the obtained vehicle function event information is at least a threshold (step S130).

If the vehicle function usage rate is at least the threshold in the processing of step S130 (step S130: Yes), period updater 15 updates the event search range such that the event search range is expanded (step S140), i.e., updates predetermined period T1 such that predetermined period T1 is lengthened.

If the vehicle function usage rate is not at least the threshold in the processing of step S130 (step S130: No), period updater 15 updates the event search range such that the event search range is reduced (step S150), i.e., updates predetermined period T1 such that predetermined period T1 is shortened.

If a vehicle function event is not present in the processing of step S110 (step S110: No), period updater 15 updates the event search range such that the event search range is not changed (step S120), i.e., updates predetermined period T1 such that predetermined period T1 is not changed.

Period updater 15 ends the event search range calculation processing when the processing of step S120 ends, when the processing of step S140 ends, or when the processing of step S150 ends.

Returning to FIG. 10, descriptions of the first vehicle attack event continuity determination processing will be continued.

Once the event search range calculation processing ends, determiner 12 examines whether the inter-event elapsed time is within the event search range (step S60), i.e., whether the inter-event elapsed time is no greater than predetermined period T1.

If the inter-event elapsed time is within the event search range in the processing of step S60 (step S60: Yes), i.e., if the inter-event elapsed time is no greater than the predetermined period T1, determiner 12 determines that the first vehicle attack event and the obtained vehicle attack event have continuity (step S65).

When the first vehicle attack event and the obtained vehicle attack event are determined to have continuity, merger 13 merges the first vehicle attack event and the obtained vehicle attack event (step S70).

If the non-detecting anomaly detector and the endpoint anomaly detector do not match in the processing of step S45 (step S45: No), or if the inter-event elapsed time is not within the event search range in the processing of step S60 (step S60: No), determiner 12 determines that the first vehicle attack event and the obtained vehicle attack event do not have continuity (step S75). The first vehicle attack event continuity determination processing then moves to the processing of step S30.

If there is no non-detecting anomaly detector in the processing of step S25 (step S25: No), if no unobtained vehicle attack event information is present in the processing of step S30 (step S30: No), or if the processing of step S70 has ended, vehicle attack event continuity determination device 10 ends the first vehicle attack event continuity determination processing.

Note that instead of the event search range calculation processing of step S55, the first vehicle attack event continuity determination processing may execute engine start event search range calculation processing, automatic driving start event search range calculation processing, high-speed travel event search range calculation processing, or software update event search range calculation processing, which will be described hereinafter.

Figure 12:
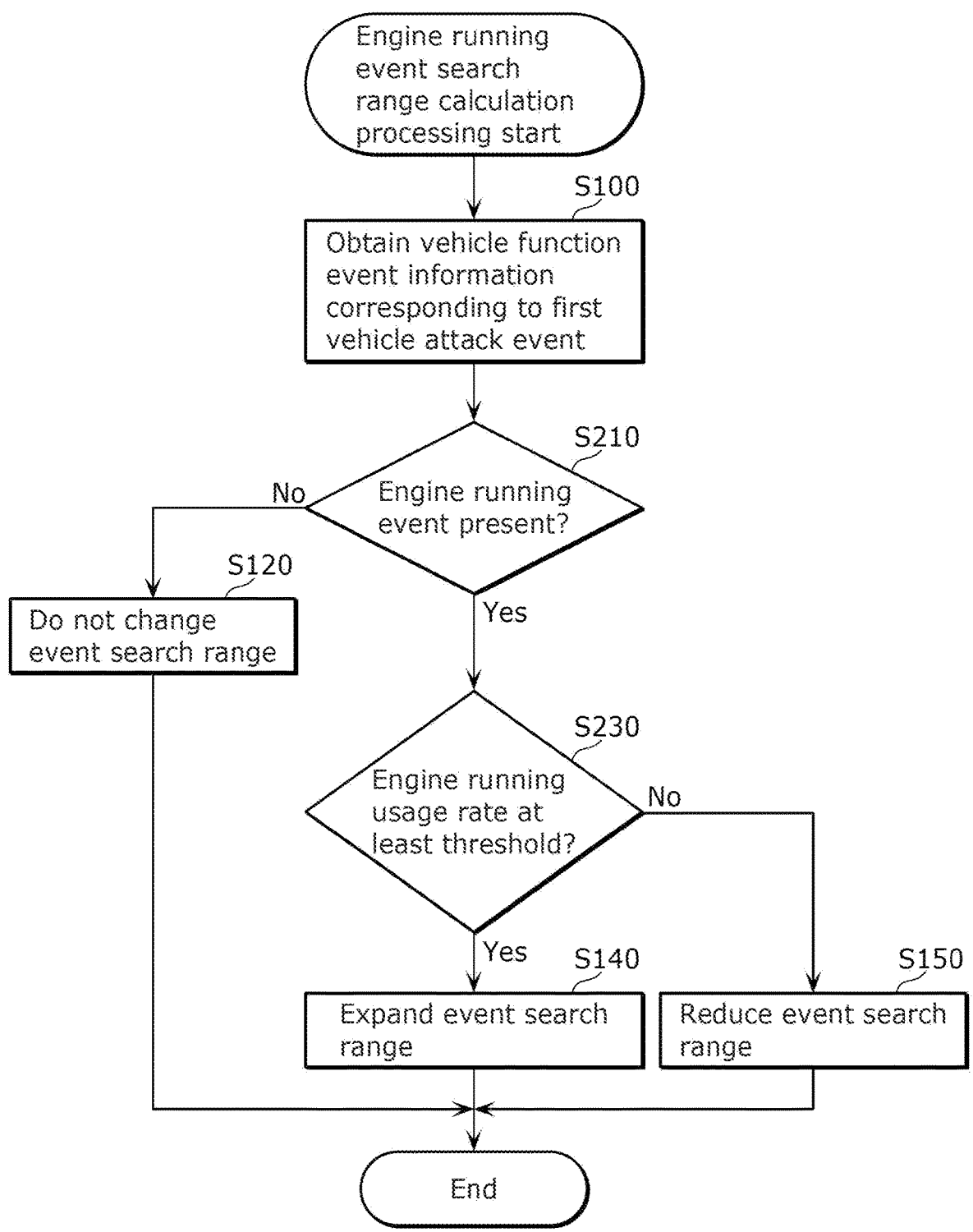
FIG. 12 is a flowchart illustrating engine start event search range calculation processing according to Embodiment 1.

FIG. 12 is a flowchart illustrating the engine start event search range calculation processing executed by period updater 15.

As illustrated in FIG. 12, the engine start event search range calculation processing is processing in which, in the event search range calculation processing illustrated in FIG. 11, the processing of step S110 has been changed to the processing of step S210, and the processing of step S130 has been changed to the processing of step S230. Accordingly, the following descriptions will focus on the processing of step S210 and the processing of step S230.

Once the processing of step S100 ends, period updater 15 examines whether an engine running event is present in the obtained vehicle function event information (step S210).

If an engine running event is present in the processing of step S210 (step S210: Yes), period updater 15 examines whether the vehicle function usage rate included in the obtained vehicle function event information, i.e., the engine running usage rate, is at least a threshold (step S230).

If the engine running usage rate is at least the threshold in the processing of step S230 (step S230: Yes), the processing moves to step S140.

If the engine running usage rate is not at least the threshold in the processing of step S230 (step S230: No), the processing moves to step S150.

If no engine running event is present in the processing of step S210 (step S210: No), the processing moves to step S120.

Period updater 15 ends the engine start event search range calculation processing when the processing of step S120 ends, when the processing of step S140 ends, or when the processing of step S150 ends.

Figure 13:
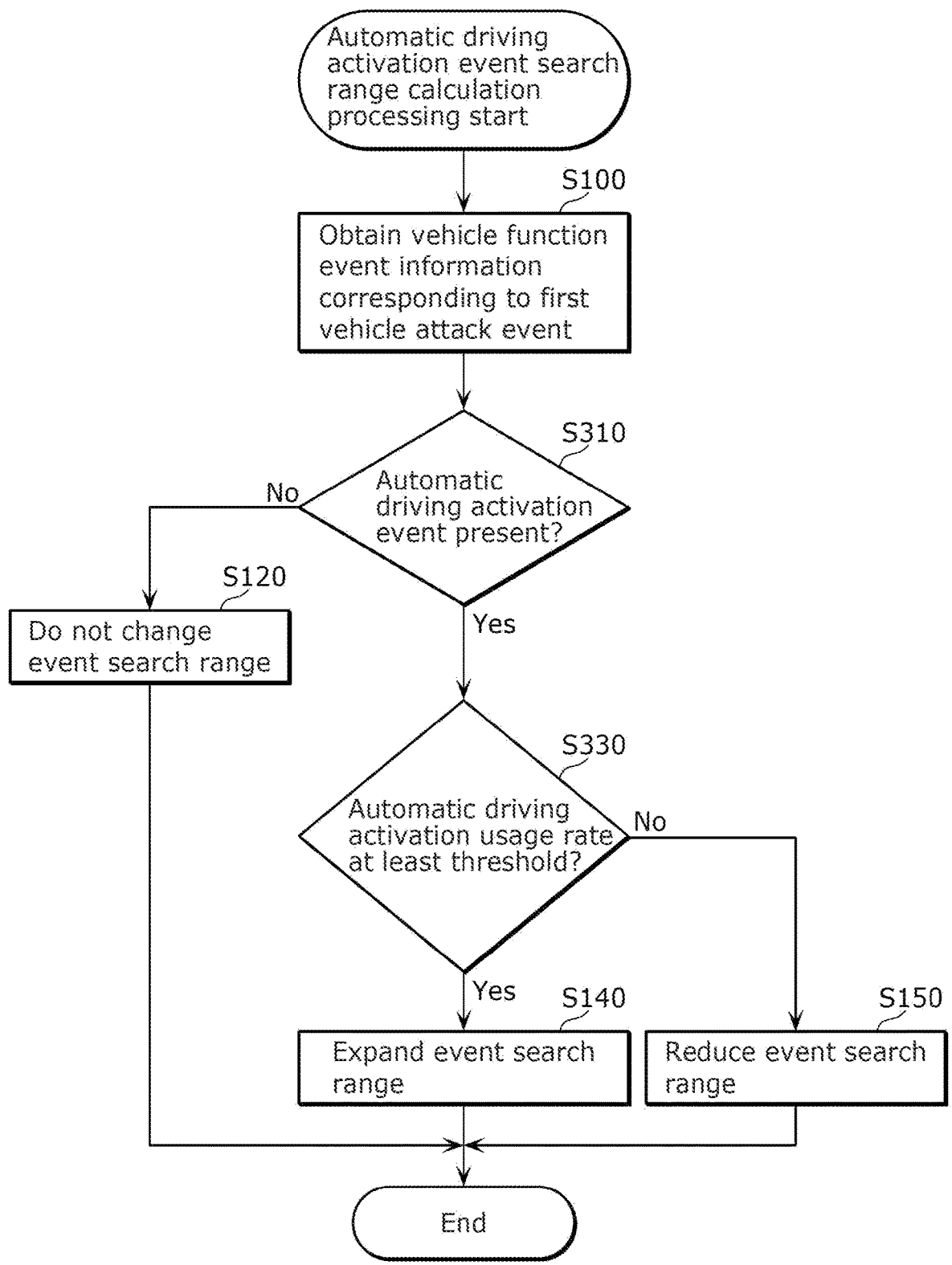
FIG. 13 is a flowchart illustrating automatic driving start event search range calculation processing according to Embodiment 1.

FIG. 13 is a flowchart illustrating the automatic driving start event search range calculation processing executed by period updater 15.

As illustrated in FIG. 13, the automatic driving start event search range calculation processing is processing in which, in the event search range calculation processing illustrated in FIG. 11, the processing of step S110 has been changed to the processing of step S310, and the processing of step S130 has been changed to the processing of step S330. Accordingly, the following descriptions will focus on the processing of step S310 and the processing of step S330.

Once the processing of step S100 ends, period updater 15 examines whether an automatic driving activation event is present in the obtained vehicle function event information (step S310).

If an automatic driving activation event is present in the processing of step S310 (step S310: Yes), period updater 15 examines whether the vehicle function usage rate included in the obtained vehicle function event information, i.e., the automatic driving activation usage rate, is at least a threshold (step S330).

If the automatic driving activation usage rate is at least the threshold in the processing of step S330 (step S330: Yes), the processing moves to step S140.

If the automatic driving activation usage rate is not at least the threshold in the processing of step S330 (step S330: No), the processing moves to step S150.

If no automatic driving activation event is present in the processing of step S310 (step S310: No), the processing moves to step S120.

Period updater 15 ends the automatic driving start event search range calculation processing when the processing of step S120 ends, when the processing of step S140 ends, or when the processing of step S150 ends.

Figure 14:
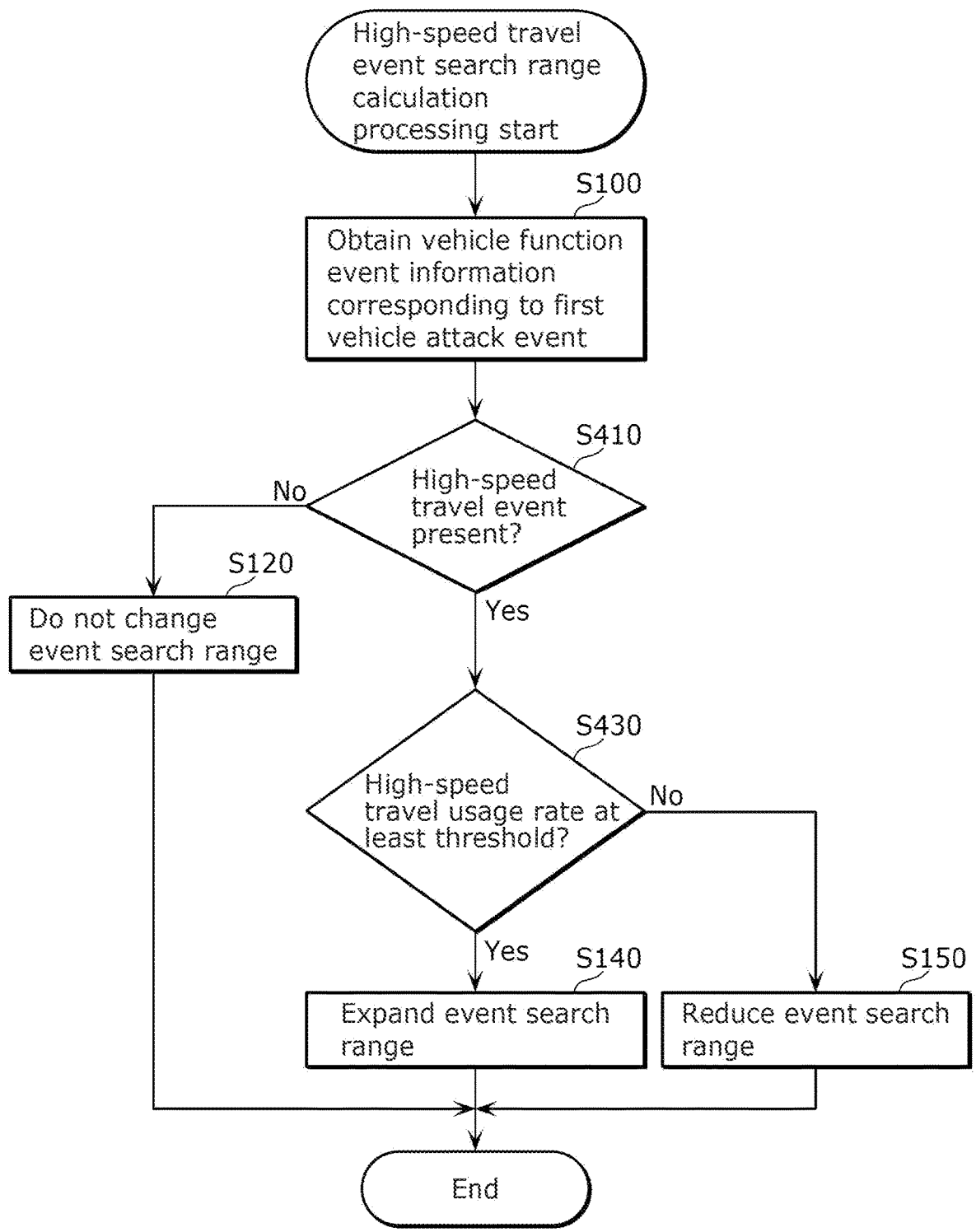
FIG. 14 is a flowchart illustrating high-speed travel event search range calculation processing according to Embodiment 1.

FIG. 14 is a flowchart illustrating the high-speed travel event search range calculation processing executed by period updater 15.

As illustrated in FIG. 14, the high-speed travel event search range calculation processing is processing in which, in the event search range calculation processing illustrated in FIG. 11, the processing of step S110 has been changed to the processing of step S410, and the processing of step S130 has been changed to the processing of step S430. Accordingly, the following descriptions will focus on the processing of step S410 and the processing of step S430.

Once the processing of step S100 ends, period updater 15 examines whether a high-speed travel event is present in the obtained vehicle function event information (step S410).

If a high-speed travel event is present in the processing of step S410 (step S410: Yes), period updater 15 examines whether the vehicle function usage rate included in the obtained vehicle function event information, i.e., the high-speed travel usage rate, is at least a threshold (step S430).

If the high-speed travel usage rate is at least the threshold in the processing of step S430 (step S430: Yes), the processing moves to step S140.

If the high-speed travel usage rate is not at least the threshold in the processing of step S430 (step S430: No), the processing moves to step S150.

If no high-speed travel event is present in the processing of step S410 (step S410: No), the processing moves to step S120.

Period updater 15 ends the high-speed travel event search range calculation processing when the processing of step S120 ends, when the processing of step S140 ends, or when the processing of step S150 ends.

Figure 15:
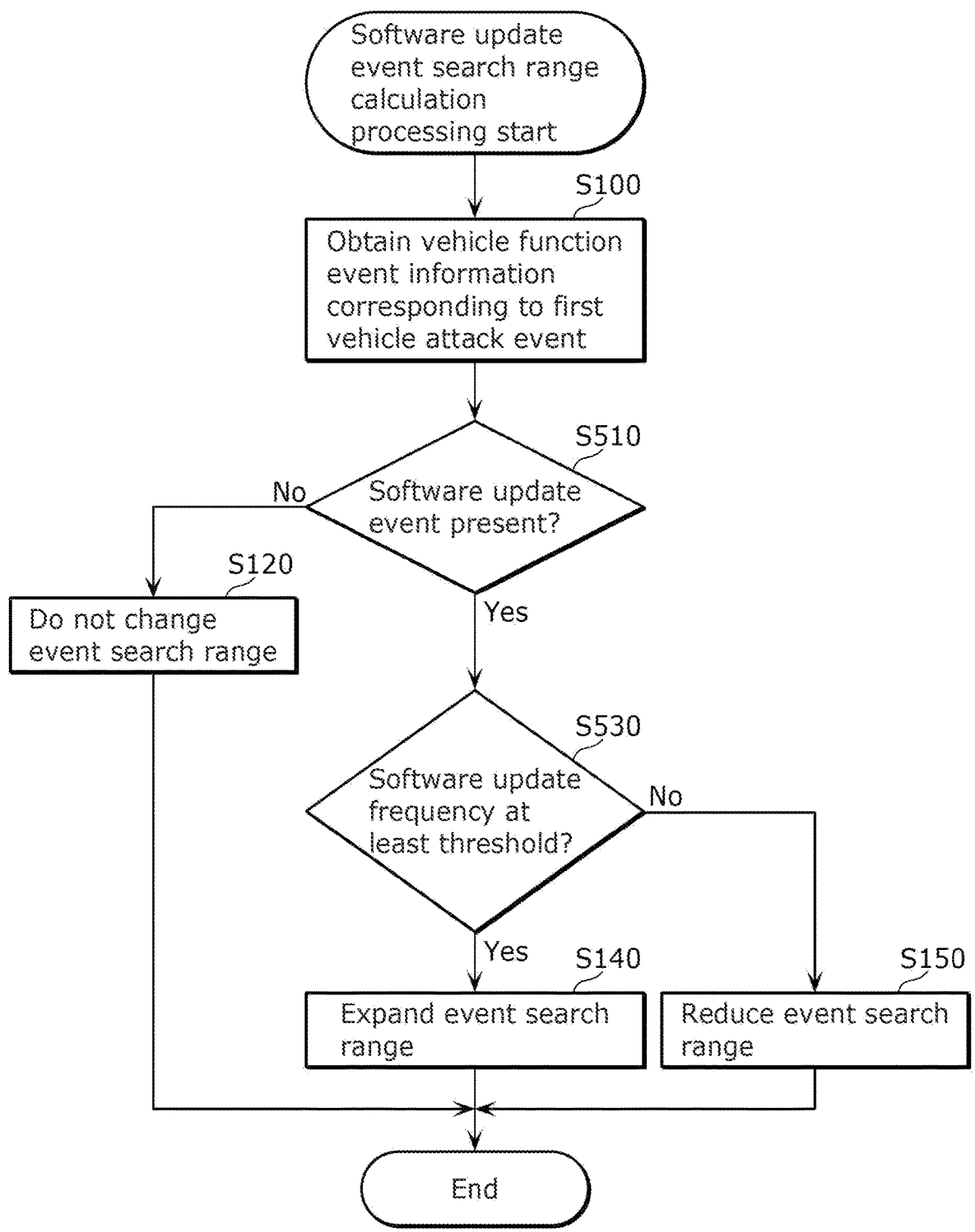
FIG. 15 is a flowchart illustrating software update event search range calculation processing according to Embodiment 1.

FIG. 15 is a flowchart illustrating the software update event search range calculation processing executed by period updater 15.

As illustrated in FIG. 15, the software update event search range calculation processing is processing in which, in the event search range calculation processing illustrated in FIG. 11, the processing of step S110 has been changed to the processing of step S510, and the processing of step S130 has been changed to the processing of step S530. Accordingly, the following descriptions will focus on the processing of step S510 and the processing of step S530.

Once the processing of step S100 ends, period updater 15 examines whether a software update event is present in the obtained vehicle function event information (step S510).

If a software update event is present in the processing of step S510 (step S510: Yes), period updater 15 examines whether the vehicle function usage rate included in the obtained vehicle function event information, i.e., the software update frequency, is at least a threshold (step S530).

If the software update frequency is at least the threshold in the processing of step S530 (step S530: Yes), the processing moves to step S140.

If the software update frequency is not at least the threshold in the processing of step S530 (step S530: No), the processing moves to step S150.

If no software update event is present in the processing of step S510 (step S510: No), the processing moves to step S120.

Period updater 15 ends the software update event search range calculation processing when the processing of step S120 ends, when the processing of step S140 ends, or when the processing of step S150 ends.

Effects

Figure 16A:
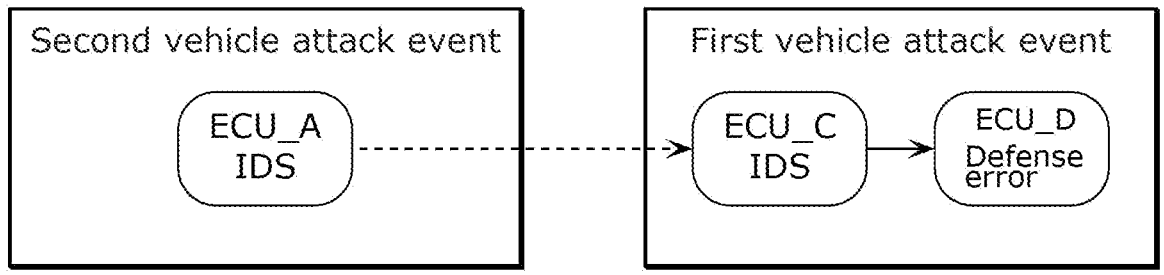
FIG. 16A is a schematic diagram illustrating the occurrence of a first phenomenon according to Embodiment 1.

FIG. 16A is a schematic diagram illustrating a situation in which, in in-vehicle network 20 where ECU_A 70A has a connection relationship to ECU_C 70C, a first phenomenon has occurred, the first phenomenon including a first vehicle attack event constituted by an IDS detection by anomaly detector_C 71C for ECU_C 70C and a subsequent defense error detection by anomaly detector_D 71D for ECU_D 70D, and a second vehicle attack event constituted by an IDS detection by anomaly detector_A 71A for ECU_A 70A.

At this time, when (1) anomaly detector_A 71A is a non-detecting anomaly detector for the first vehicle attack event and the endpoint anomaly detector for the second vehicle attack event, and furthermore, (2) the inter-event elapsed time between the first vehicle attack event and the second vehicle attack event is within the event search range, vehicle attack event continuity determination device 10 determines that the first vehicle attack event and the second vehicle attack event have continuity.

When a determination that there is continuity is made in this manner, the user using vehicle attack event continuity determination device 10 can consider a latent attack constituted by the first vehicle attack event and the second vehicle attack event to be a single vehicle attack event for the first phenomenon, and can analyze the attack in that vehicle attack event.

Figure 16B:
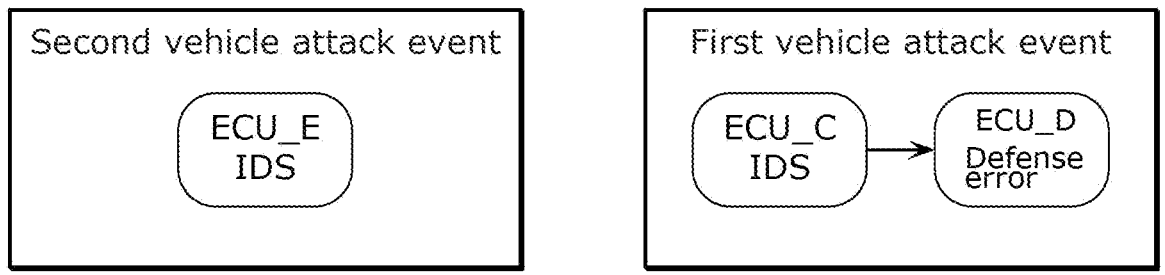
FIG. 16B is a schematic diagram illustrating the occurrence of a second phenomenon according to Embodiment 1.

FIG. 16B is a schematic diagram illustrating a situation in which, in in-vehicle network 20 where ECU_E 70E has no connection relationship to ECU_C 70C, a second phenomenon has occurred, the second phenomenon including a first vehicle attack event constituted by an IDS detection by anomaly detector_C 71C for ECU_C 70C and a subsequent defense error detection by anomaly detector_D 71D for ECU_D 70D, and a second vehicle attack event constituted by an IDS detection by anomaly detector_E 71E for ECU_E 70E.

At this time, anomaly detector_E 71E is not calculated as a non-detecting anomaly detector for the first vehicle attack event, and thus vehicle attack event continuity determination device 10 determines that the first vehicle attack event and the second vehicle attack event do not have continuity.

When this determination that there is no continuity is made, the user using vehicle attack event continuity determination device 10 can analyze the first vehicle attack event and the second vehicle attack event without considering the first vehicle attack event and the second vehicle attack event to be a single latent attack for the second phenomenon.

Figure 16C:
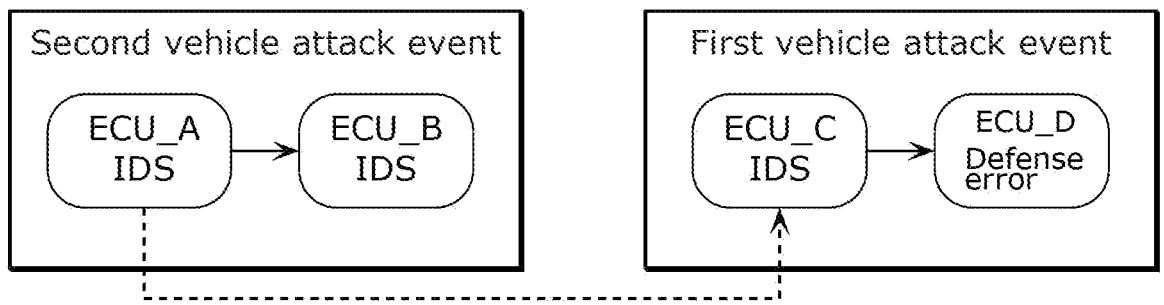
FIG. 16C is a schematic diagram illustrating the occurrence of a third phenomenon according to Embodiment 1.

FIG. 16C is a schematic diagram illustrating a situation in which, in in-vehicle network 20 where ECU_A 70A has a connection relationship to ECU_C 70C but ECU_B 70B does not have a connection relationship to ECU_C 70C, a third phenomenon has occurred, the third phenomenon including a first vehicle attack event constituted by an IDS detection by anomaly detector_C 71C for ECU_C 70C and a subsequent defense error detection by anomaly detector_D 71D for ECU_D 70D, and a second vehicle attack event constituted by an IDS detection by anomaly detector_A 71A for ECU_A 70A and a subsequent IDS detection by anomaly detector_B 71B for ECU_B 70B.

At this time, ECU_B 70B, which is the endpoint anomaly detector for the second vehicle attack event, is not calculated as a non-detecting anomaly detector for the first vehicle attack event, and thus vehicle attack event continuity determination device 10 determines that the first vehicle attack event and the second vehicle attack event do not have continuity.

When this determination that there is no continuity is made, the user using vehicle attack event continuity determination device 10 can analyze the first vehicle attack event and the second vehicle attack event without considering the first vehicle attack event and the second vehicle attack event to be a single latent attack for the third phenomenon.

Figure 16D:
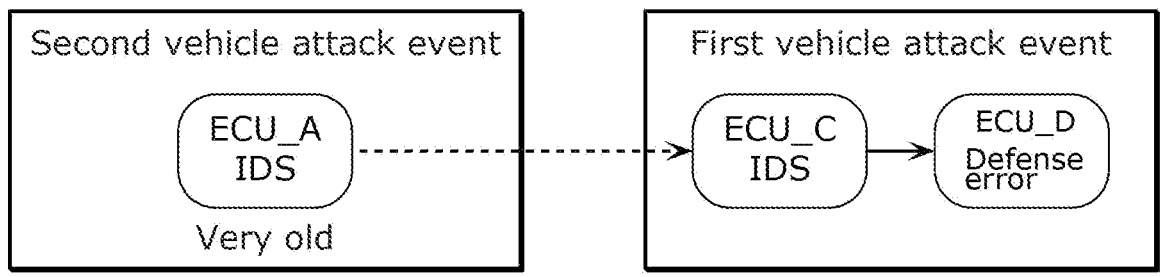
FIG. 16D is a schematic diagram illustrating the occurrence of a fourth phenomenon according to Embodiment 1.

FIG. 16D is a schematic diagram illustrating a situation in which, in in-vehicle network 20 where ECU_A 70A has a connection relationship to ECU_C 70C, a fourth phenomenon has occurred, the fourth phenomenon including a first vehicle attack event constituted by an IDS detection by anomaly detector_C 71C for ECU_C 70C and a subsequent defense error detection by anomaly detector_D 71D for ECU_D 70D, and a second vehicle attack event constituted by an IDS detection by anomaly detector_A 71A for ECU_A 70A, with the inter-event elapsed time between the first vehicle attack event and the second vehicle attack event being outside the event search range.

At this time, the inter-event elapsed time between the first vehicle attack event and the second vehicle attack event is within the event search range, and thus vehicle attack event continuity determination device 10 determines that the first vehicle attack event and the second vehicle attack event have continuity.

When this determination that there is no continuity is made, the user using vehicle attack event continuity determination device 10 can analyze the first vehicle attack event and the second vehicle attack event without considering the first vehicle attack event and the second vehicle attack event to be a single latent attack for the fourth phenomenon.

Figure 17:
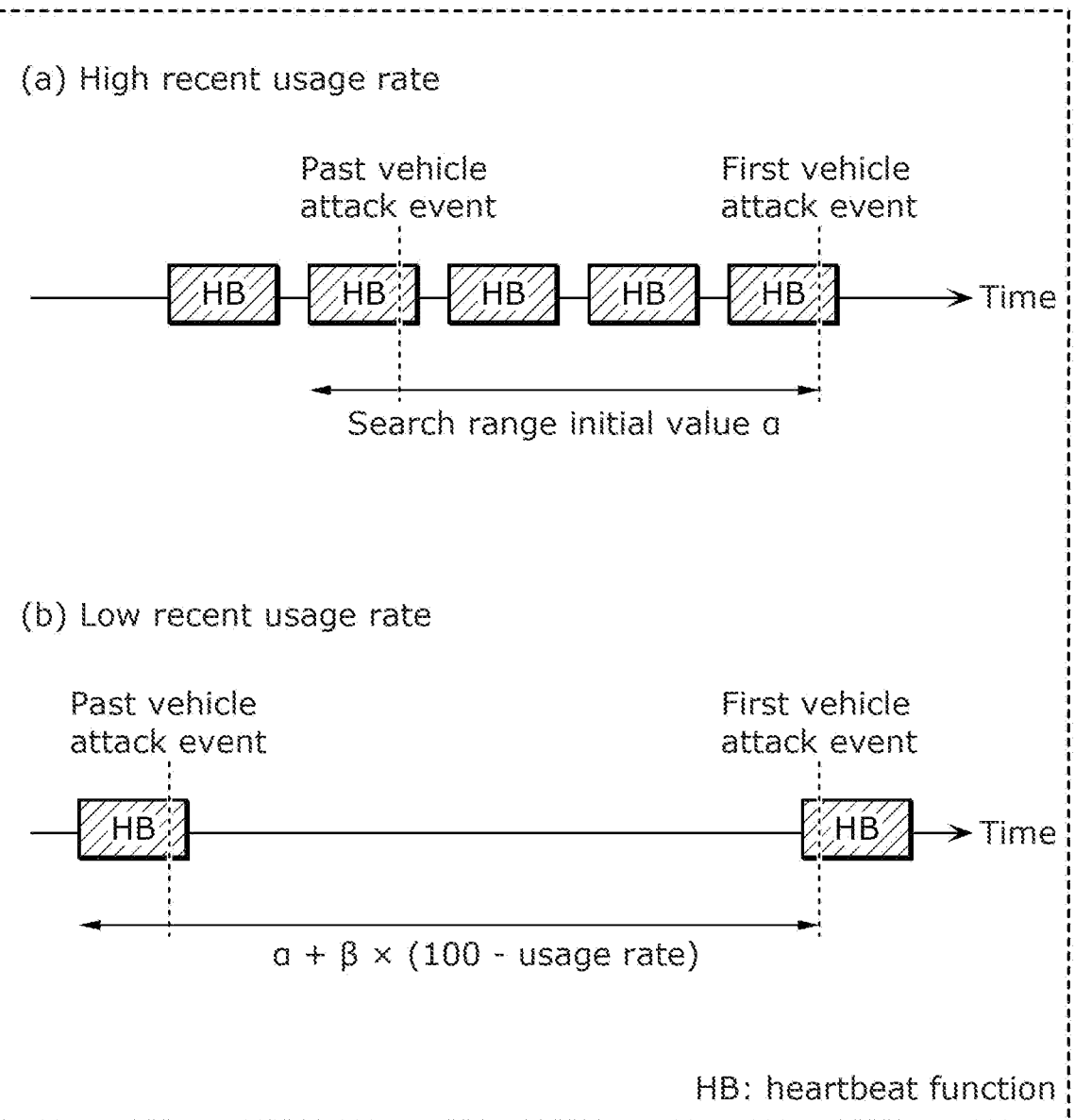
FIG. 17 is a schematic diagram illustrating a usage state of a vehicle function event.

FIG. 17 is a schematic diagram illustrating a usage state of a vehicle function event that is the same as a vehicle function event which has occurred within predetermined period TB into the past from the first time, which is the earliest detection time in the first vehicle attack event (also called a "most recently-started vehicle function event" hereinafter).

Generally speaking, it is known that in a latent attack, the start of some vehicle function event triggers the end of a latent period thereof and the resumption of the attack activity.

Accordingly, when the usage rate of a vehicle function event that is the same as the most recently-started vehicle function event is relatively high, as indicated by (a) in FIG. 17, it is thought that a period between a pre-latency attack and a post-latency attack in a single latent attack is likely to be relatively short.

Accordingly, when a vehicle function event, which is the same as a vehicle function event which occurred within predetermined period TB into the past from the first time, has occurred within predetermined period TC into the past from the first time and has occurred a number of times or for a duration that is at least a predetermined threshold, period updater 15 updates predetermined period T1 such that predetermined period T1 is shortened.

As a result, vehicle attack event continuity determination device 10 can determine that the first vehicle attack event and the second vehicle attack event have continuity, relatively efficiently and effectively.

Conversely, when the usage rate of a vehicle function event that is the same as the most recently-started vehicle function event is relatively low, as indicated by (b) in FIG. 17, it is thought that a period between a pre-latency attack and a post-latency attack in a single latent attack is likely to be relatively long.

Accordingly, when a vehicle function event, which is the same as a vehicle function event which occurred within predetermined period TB into the past from the first time, has occurred within predetermined period TC into the past from the first time and has occurred a number of times or for a duration that is less than predetermined threshold, period updater 15 updates predetermined period T1 such that predetermined period T1 is lengthened.

As a result, vehicle attack event continuity determination device 10 can determine that the first vehicle attack event and the second vehicle attack event have continuity, relatively efficiently and effectively.

Embodiment 2

A vehicle attack event continuity determination device according to Embodiment 2, which is configured by changing some of the functions of vehicle attack event continuity determination device 10 according to Embodiment 1, will be described next. Here, in the vehicle attack event continuity determination device according to Embodiment 2, constituent elements that are the same as those in vehicle attack event continuity determination device 10 have already been described, and will therefore be given the same reference signs and will not be described in detail. The descriptions will instead focus on the differences from vehicle attack event continuity determination device 10.

Configuration

Figure 18:
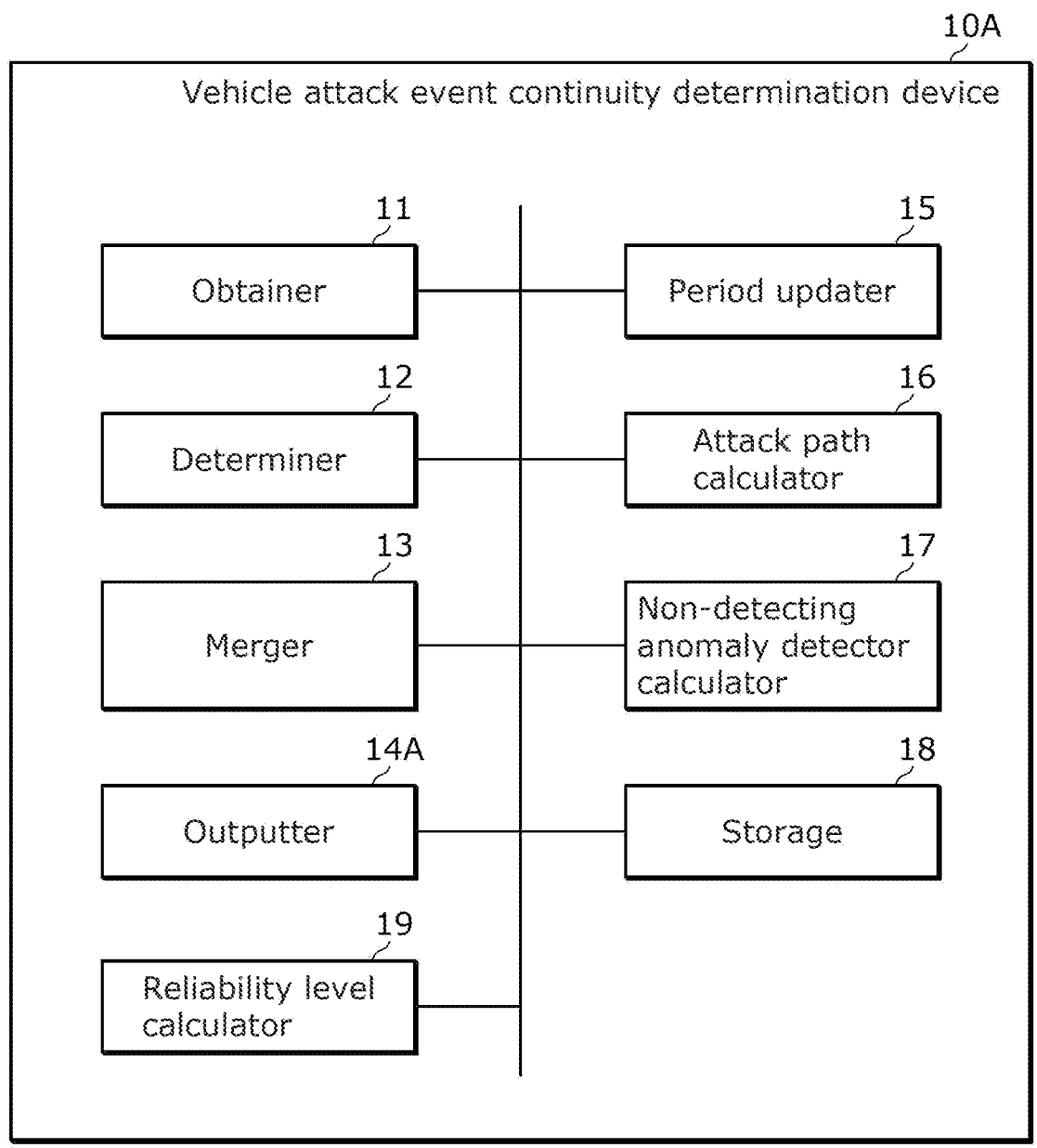
FIG. 18 is a block diagram illustrating an example of the configuration of a vehicle attack event continuity determination device according to Embodiment 2.

FIG. 18 is a block diagram illustrating an example of the configuration of vehicle attack event continuity determination device 10A according to Embodiment 2.

As illustrated in FIG. 18, vehicle attack event continuity determination device 10A differs from vehicle attack event continuity determination device 10 according to Embodiment 1 in that reliability level calculator 19 has been added and outputter 14 has been changed to outputter 14A.

When merger 13 has merged the first vehicle attack event and the second vehicle attack event, reliability level calculator 19 calculates a reliability level of a post-merger vehicle attack event obtained by merging the first vehicle attack event and the second vehicle attack event, based on the first vehicle attack event information indicating the first vehicle attack event and the second vehicle attack event information indicating the second vehicle attack event.

Reliability level calculator 19 may calculate the reliability level as, for example, a match rate of anomaly detectors 71 which detected an anomaly in the first vehicle attack event and the second vehicle attack event with respect to anomaly detectors 71 present in an attack path calculated for the first vehicle attack event by attack path calculator 16.

For example, when anomaly detectors 71 present in the attack path are anomaly detector_A 71A, anomaly detector_B 71B, anomaly detector_C 71C, and anomaly detector_D 71D, and anomaly detectors 71 which detected an anomaly in the first vehicle attack event and the second vehicle attack event are anomaly detector_A 71A, anomaly detector_B 71B, and anomaly detector_C 71C, reliability level calculator 19 calculates the reliability level as $3/4=0.75$.

Additionally, reliability level calculator 19 may calculate the reliability level as, for example, a match rate of the anomaly detection types detected by anomaly detectors 71 which detected an anomaly in the first vehicle attack event and the second vehicle attack event with respect to the anomaly detection types detected by anomaly detectors 71 present in an attack path calculated for the first vehicle attack event by attack path calculator 16.

For example, when the anomaly detection types detected by anomaly detectors 71 present in the attack path are anomaly detector_A_Anomaly1, anomaly detector_B_Anomaly2, anomaly detector_C_Anomaly3, anomaly detector_D_Anomaly4, and anomaly detector_E_Anomaly5, and the anomaly detection types detected by anomaly detectors 71 which detected an anomaly in the first vehicle attack event and the second vehicle attack event are anomaly detector_A_Anomaly1, anomaly detector_B_Anomaly2, and anomaly detector_C_Anomaly3, reliability level calculator 19 calculates the reliability level as $3/5=0.60$.

Outputter 14A outputs the determination result from determiner 12 and the reliability level calculated by reliability level calculator 19. More specifically, outputter 14A outputs, to display device 41, a second display control signal which includes the determination result and the reliability level, and which causes display device 41 to display the determination result and the reliability level.

FIG. 19 is a schematic diagram illustrating an example of an image displayed by display device 41 which has received the second display control signal output by outputter 14A, based on the second display control signal.

As illustrated in FIG. 19, display device 41, which has received the second display control signal output from outputter 14A, displays the determination result from determiner 12 and the reliability level calculated by reliability level calculator 19.

Operations

Operations performed by vehicle attack event continuity determination device 10A having the above-described configuration will be described next with reference to the drawings.

Vehicle attack event continuity determination device 10A executes the second vehicle attack event continuity determination processing, in which some of the processing has been changed from the first vehicle attack event continuity determination processing performed by vehicle attack event continuity determination device 10.

Figure 20:
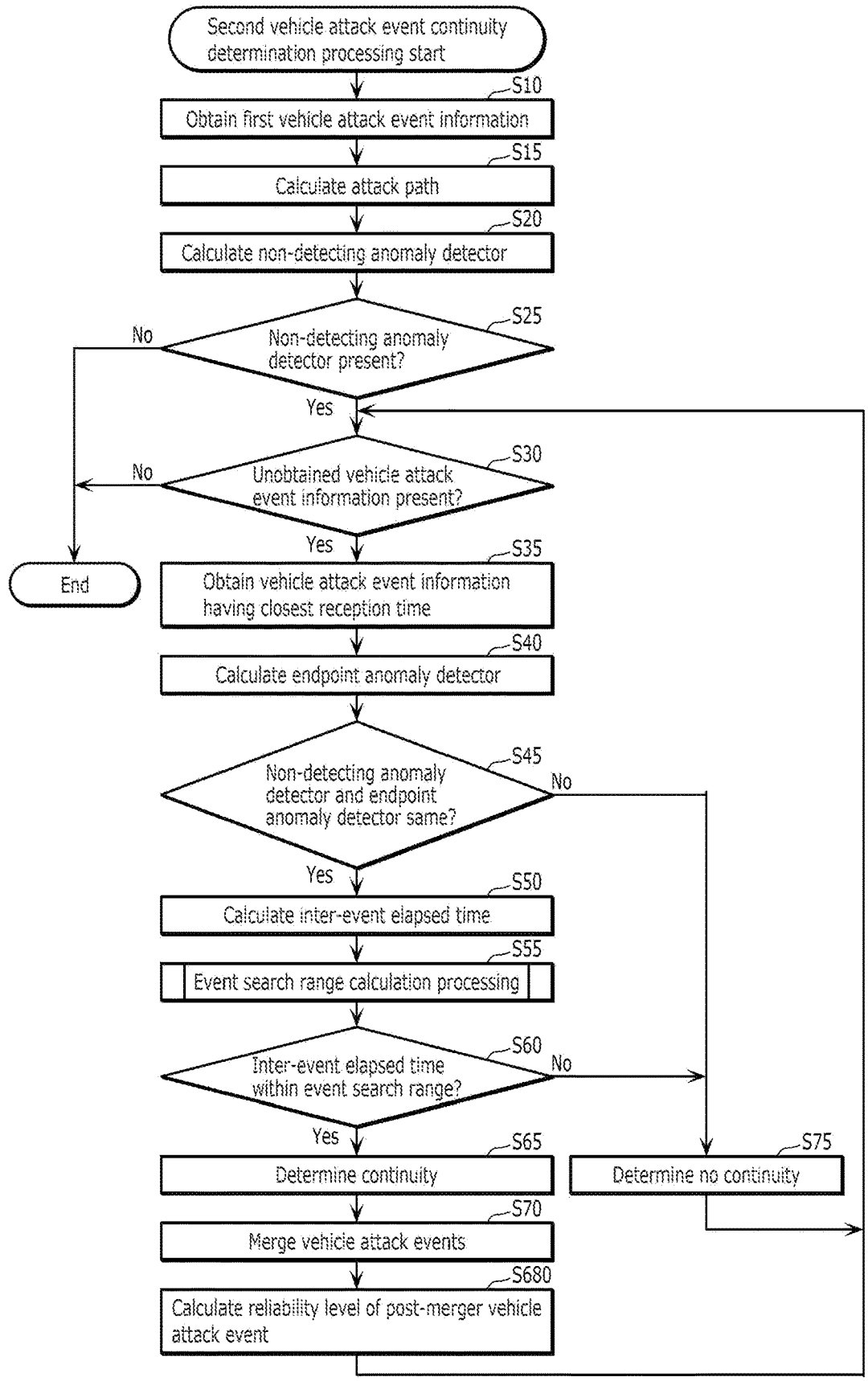
FIG. 20 is a flowchart illustrating second vehicle attack event continuity determination processing according to Embodiment 2.

FIG. 20 is a flowchart illustrating the second vehicle attack event continuity determination processing performed by vehicle attack event continuity determination device 10A.

As illustrated in FIG. 20, the second vehicle attack event continuity determination processing is processing in which the processing of step S680 is added to the first vehicle attack event continuity determination processing, and which is changed such that the second vehicle attack event continuity determination processing is ended if there is no non-detecting anomaly detector in the processing of step S25 (step S25: No) or if no unobtained vehicle attack event information is present in the processing of step S30 (step S30: No).

Accordingly, the following descriptions will focus on the processing of step S680.

When the processing of step S70 ends, reliability level calculator 19 calculates the reliability level of the post-merger vehicle attack event obtained by merging the first attack event and the obtained vehicle attack event, based on the first vehicle attack event information indicating the first vehicle attack event and the vehicle attack event information indicating the obtained vehicle attack event (step S680).

When the processing of step S680 ends, the second vehicle attack event continuity determination processing moves to the processing of step S30.

Effects

According to vehicle attack event continuity determination device 10A configured as described above, a determination result for the continuity between the first vehicle attack event and the second vehicle attack event, and the reliability level of the post-merger vehicle attack event obtained by merging the first vehicle attack event and the second merged event, are displayed in display device 41.

As a result, the user using vehicle attack event continuity determination device 10A can determine whether the first vehicle attack event and the second vehicle attack event should be considered to be a single latent attack based on the content displayed in display device 41.

Supplemental Descriptions

Descriptions have been given based on Embodiment 1 and Embodiment 2, which serve as examples of the technique disclosed in the present application. However, the present disclosure is not intended to be limited to these embodiments. Variations on the present embodiment conceived by one skilled in the art, embodiments implemented by combining constituent elements from different other embodiments, and the like may be included in the scope of one or more aspects of the present disclosure as well, as long as they do not depart from the essential spirit of the present disclosure.

(1) Embodiment 1 described vehicle attack event continuity determination device 10 as being realized by server device 40 located outside in-vehicle network 20. However, it is not necessary for vehicle attack event continuity determination device 10 to be limited to being realized by server device 40, nor is it necessary for vehicle attack event continuity determination device 10 to be realized in a device outside in-vehicle network 20. For example, vehicle attack event continuity determination device 10 may be realized within in-vehicle network 20.

In this case, in-vehicle network 20 may include a processor and a memory, for example, and vehicle attack event continuity determination device 10 may be realized by the processor executing a program stored in the memory.

(2) Some or all of the constituent elements included in vehicle attack event continuity determination device 10 may be realized by dedicated or general-purpose circuitry.

Some or all of the constituent elements included in vehicle attack event continuity determination device 10 may be implemented by a single integrated circuit through system LSI (Large-Scale Integration), for example. "System LSI" refers to very-large-scale integration in which multiple constituent elements are integrated on a single chip, and specifically, refers to a computer system configured including a microprocessor, read-only memory (ROM), random access memory (RAM), and the like. A computer program is stored in the ROM. The system LSI circuit realizes the functions of the devices by the microprocessor operating in accordance with the computer program.

Note that although the term "system LSI" is used here, other names, such as IC, LSI, super LSI, ultra LSI, and so on may be used, depending on the level of integration. Furthermore, the manner in which the circuit integration is achieved is not limited to LSI, and it is also possible to use a dedicated circuit or a generic processor. It is also possible to employ a Field Programmable Gate Array (FPGA) which is programmable after the LSI circuit has been manufactured, or a reconfigurable processor in which the connections and settings of the circuit cells within the LSI circuit can be reconfigured.

Furthermore, if other technologies that improve upon or are derived from semiconductor technology enable integration technology to replace LSI circuits, then naturally it is also possible to integrate the function blocks using that technology. Biotechnology applications are one such foreseeable example.

(3) Rather than such a vehicle attack event continuity determination device 10, one aspect of the present disclosure may be a vehicle attack event continuity determination method which implements the characteristic constituent elements included in vehicle attack event continuity determination device 10 as steps. Additionally, one aspect of the present disclosure may be realized as a computer program that causes a computer to execute the characteristic steps included in the vehicle attack event continuity determination method. Furthermore, aspects of the present disclosure may be realized as a computer-readable non-transitory recording medium in which such a computer program is recorded.

INDUSTRIAL APPLICABILITY

The present disclosure is widely applicable in attack monitoring systems and the like which monitor for cyber attacks on a network.

The invention claimed is:

1. A vehicle attack event continuity determination method comprising:
obtaining first vehicle attack event information pertaining to a first vehicle attack event which has occurred in an in-vehicle network, second vehicle attack event information pertaining to a second vehicle attack event which has occurred in the in-vehicle network before the first vehicle attack event, and in-vehicle network information indicating a configuration of the in-vehicle network;
determining whether there is continuity between the first vehicle attack event and the second vehicle attack event based on the first vehicle attack event information, the second vehicle attack event information, and the in-vehicle network information; and
outputting a result of the determining,
wherein the in-vehicle network includes a plurality of anomaly detectors,
the first vehicle attack event information includes information indicating one or more first anomaly detectors, among the plurality of anomaly detectors, that have detected an anomaly in the first vehicle attack event,
the second vehicle attack event information includes information indicating one or more second anomaly detectors, among the plurality of anomaly detectors, that have detected an anomaly in the second vehicle attack event,
the determining includes calculating an attack path in the first vehicle attack event, calculating a non-detecting anomaly detector which has not detected an anomaly in the first attack event and which is located upstream from the one or more first anomaly detectors in the attack path, and determining that there is continuity between the first vehicle attack event and the second vehicle attack event when the non-detecting anomaly detector is an endpoint anomaly detector, among the one or more second anomaly detectors, that has most recently detected an anomaly,
the determining includes determining the continuity for the second vehicle attack event that has occurred within a first predetermined period from an occurrence time of the first vehicle attack event,
the obtaining further includes obtaining vehicle function event information pertaining to a vehicle function event that has occurred in a vehicle in which the in-vehicle network is installed,
the determining further includes determining the continuity also based on the vehicle function event information,
the vehicle function event information further includes a vehicle function usage rate pertaining to a total number of times or a duration for which a first vehicle function event has occurred within a third predetermined period into the past from a first time that is an earliest time at which the one or more first anomaly detectors have detected an anomaly, the first vehicle function event being identical to a vehicle function event that has occurred within a second predetermined period into the past from the first time, and the third predetermined period being longer than the second predetermined period, the vehicle attack event continuity determination method further comprises updating the first predetermined period based on the vehicle function usage rate, and the determining includes determining the continuity using the first predetermined period updated in the updating.

2. The vehicle attack event continuity determination method according to claim 1, wherein the obtaining further includes obtaining third vehicle attack event information pertaining to a third vehicle attack event which has occurred in the in-vehicle network before the second vehicle attack event, and the determining further includes, when it has been determined that there is no continuity between the first vehicle attack event and the second vehicle attack event, determining whether there is continuity between the first vehicle attack event and the third vehicle attack event based on the first vehicle attack event information, the third vehicle attack event information, and the in-vehicle network information.

3. The vehicle attack event continuity determination method according to claim 1, wherein the updating includes updating the first predetermined period such that (1) the first predetermined period is not changed when the first vehicle function event has not occurred within the third predetermined period into the past from the first time, (2) the first predetermined period is shortened when the first vehicle function event has occurred within the third predetermined period into the past from the first time and for a total number of times or a duration that is at least a predetermined threshold, or (3) the first predetermined period is lengthened when the first vehicle function event has occurred within the third predetermined period into the past from the first time and for a total number of times or a duration that is less than the predetermined threshold.

4. The vehicle attack event continuity determination method according to claim 1, wherein the first vehicle function event is an engine running event in which an engine of the vehicle is running.

5. The vehicle attack event continuity determination method according to claim 1, wherein the first vehicle function event is an automatic driving activation event in which automatic driving of the vehicle is active.

6. The vehicle attack event continuity determination method according to claim 1, wherein the first vehicle function event is a high-speed travel event in which the vehicle travels at a high speed.

7. The vehicle attack event continuity determination method according to claim 1, wherein the first vehicle function event is a software update event of updating software of the vehicle.

8. The vehicle attack event continuity determination method according to claim 1, further comprising:

merging the first vehicle attack event and the second vehicle attack event when it is determined in the determining that there is continuity.

9. The vehicle attack event continuity determination method according to claim 8, further comprising:

when the first vehicle attack event and the second vehicle attack event have been merged into a post-merger vehicle attack event in the merging, calculating a reliability level of the post-merger vehicle attack event based on the first vehicle attack event information and the second vehicle attack event information, wherein the outputting further includes outputting the reliability level.

10. A vehicle attack event continuity determination device comprising:

a processor;

and memory storing a program, wherein, when the program is executed by the processor, the program causes the processor to perform processing of:

obtaining first vehicle attack event information pertaining to a first vehicle attack event which has occurred in an in-vehicle network, second vehicle attack event information pertaining to a second vehicle attack event which has occurred in the in-vehicle network before the first vehicle attack event, and in-vehicle network information indicating a configuration of the in-vehicle network;

determining whether there is continuity between the first vehicle attack event and the second vehicle attack event based on the first vehicle attack event information, the second vehicle attack event information, and the in-vehicle network information; and outputting a result of the determining, the in-vehicle network includes a plurality of anomaly detectors, the first vehicle attack event information includes information indicating one or more first anomaly detectors, among the plurality of anomaly detectors, that have detected an anomaly in the first vehicle attack event, the second vehicle attack event information includes information indicating one or more second anomaly detectors, among the plurality of anomaly detectors, that have detected an anomaly in the second vehicle attack event, the determining includes calculating an attack path in the first vehicle attack event, calculating a non-detecting anomaly detector which has not detected an anomaly in the first attack event and which is located upstream from the one or more first anomaly detectors in the attack path, and determining that there is continuity between the first vehicle attack event and the second vehicle attack event when the non-detecting anomaly detector is an endpoint anomaly detector, among the one or more second anomaly detectors, that has most recently detected an anomaly, the determining includes determining the continuity for the second vehicle attack event that has occurred within a first predetermined period from an occurrence time of the first vehicle attack event, the obtaining further includes obtaining vehicle function event information pertaining to a vehicle function event that has occurred in a vehicle in which the in-vehicle network is installed, the determining further includes determining the continuity also based on the vehicle function event information, the vehicle function event information further includes a vehicle function usage rate pertaining to a total number of times or a duration for which a first vehicle function event has occurred within a third predetermined period into the past from a first time that is an earliest time at which the one or more first anomaly detectors have detected an anomaly, the first vehicle function event being identical to a vehicle function event that has occurred within a second predetermined period into the past from the first time, and the third predetermined period being longer than the second predetermined period, when the program is executed by the processor, the program further causes the processor to perform processing of updating the first predetermined period based on the vehicle function usage rate, and the determining includes determining the continuity using the first predetermined period updated.

11. A non-transitory computer-readable recording medium having recorded thereon a program for causing a computer to execute vehicle attack event continuity determination processing, the vehicle attack event continuity determination processing comprising:

obtaining first vehicle attack event information pertaining to a first vehicle attack event which has occurred in an in-vehicle network, second vehicle attack event information pertaining to a second vehicle attack event which has occurred in the in-vehicle network before the first vehicle attack event, and in-vehicle network information indicating a configuration of the in-vehicle network;

determining whether there is continuity between the first vehicle attack event and the second vehicle attack event based on the first vehicle attack event information, the second vehicle attack event information, and the in-vehicle network information; and outputting a result of the determining, wherein the in-vehicle network includes a plurality of anomaly detectors, the first vehicle attack event information includes information indicating one or more first anomaly detectors, among the plurality of anomaly detectors, that have detected an anomaly in the first vehicle attack event, the second vehicle attack event information includes information indicating one or more second anomaly detectors, among the plurality of anomaly detectors, that have detected an anomaly in the second vehicle attack event, the determining includes calculating an attack path in the first vehicle attack event, calculating a non-detecting anomaly detector which has not detected an anomaly in the first attack event and which is located upstream from the one or more first anomaly detectors in the attack path, and determining that there is continuity between the first vehicle attack event and the second vehicle attack event when the non-detecting anomaly detector is an endpoint anomaly detector, among the one or more second anomaly detectors, that has most recently detected an anomaly, the determining includes determining the continuity for the second vehicle attack event that has occurred within a first predetermined period from an occurrence time of the first vehicle attack event, the obtaining further includes obtaining vehicle function event information pertaining to a vehicle function event that has occurred in a vehicle in which the in-vehicle network is installed, the determining further includes determining the continuity also based on the vehicle function event information, the vehicle function event information further includes a vehicle function usage rate pertaining to a total number of times or a duration for which a first vehicle function event has occurred within a third predetermined period into the past from a first time that is an earliest time at which the one or more first anomaly detectors have detected an anomaly, the first vehicle function event being identical to a vehicle function event that has occurred within a second predetermined period into the past from the first time, and the third predetermined period being longer than the second predetermined period, the vehicle attack event continuity determination processing further comprises updating the first predetermined period based on the vehicle function usage rate, and the determining includes determining the continuity using the first predetermined period updated in the updating.

* * * * *